(12) United States Patent
Maruhashi

(10) Patent No.: US 12,454,307 B2
(45) Date of Patent: Oct. 28, 2025

(54) ELECTRIC DRIVE DEVICE AND ELECTRIC POWER STEERING DEVICE

(71) Applicant: NSK Steering & Control, Inc., Tokyo (JP)

(72) Inventor: Akio Maruhashi, Tokyo (JP)

(73) Assignee: NSK STEERING & CONTROL, INC., Tokyo (JP)

( * ) Notice: Subject to any disclaimer, the term of this patent is extended or adjusted under 35 U.S.C. 154(b) by 0 days.

(21) Appl. No.: 18/865,916

(22) PCT Filed: Oct. 26, 2023

(86) PCT No.: PCT/JP2023/038657
§ 371 (c)(1),
(2) Date: Nov. 14, 2024

(87) PCT Pub. No.: WO2024/095882
PCT Pub. Date: May 10, 2024

(65) Prior Publication Data
US 2025/0171074 A1    May 29, 2025

(30) Foreign Application Priority Data
Oct. 31, 2022    (JP) .................................. 2022-175020

(51) Int. Cl.
*B62D 5/04* (2006.01)
*H02K 3/28* (2006.01)
(Continued)

(52) U.S. Cl.
CPC .............. *B62D 5/046* (2013.01); *H02K 3/28* (2013.01); *H02K 11/0094* (2013.01); *H02K 11/33* (2016.01); *H02K 2211/03* (2013.01)

(58) Field of Classification Search
CPC .......... B62D 5/046; H02K 11/33; H02K 3/28; H02K 11/0094; H02K 2211/03
See application file for complete search history.

(56) References Cited

U.S. PATENT DOCUMENTS

| | | | |
|---|---|---|---|
| 9,359,004 B2 | 6/2016 | Kawata et al. |
| 9,479,025 B2 | 10/2016 | Kawata et al. |

(Continued)

FOREIGN PATENT DOCUMENTS

| | | | | |
|---|---|---|---|---|
| CN | 102570937 A | * | 7/2012 | ........... B62D 5/0406 |
| CN | 105322725 A | | 2/2016 | |

(Continued)

OTHER PUBLICATIONS

International Search Report for PCT/JP2023/038657, Jan. 16, 2024.
(Continued)

*Primary Examiner* — Jacob D Knutson
(74) *Attorney, Agent, or Firm* — Sughrue Mion, PLLC

(57) ABSTRACT

Provided are an electric drive device and an electric power steering device that reduce noise superimposed on a detection value detected by a current detection element in a path from the current detection element to a control circuit. The electric drive device includes a motor and an electronic control device including a circuit board. With a position on an extension line in an axial direction of a shaft as a reference position, a mounting area for a first motor driver circuit, a mounting area for a first current detection element, a mounting area for a plurality of drive elements of a first inverter circuit, and a disposition area for a first coil wiring are disposed in this order from the reference position to one side in a first direction.

7 Claims, 18 Drawing Sheets

(51) Int. Cl.
    *H02K 11/00*     (2016.01)
    *H02K 11/33*     (2016.01)

(56) References Cited

U.S. PATENT DOCUMENTS

| | | | |
|---|---|---|---|
| 10,759,467 | B2 | 9/2020 | Sonoda et al. |
| 11,387,716 | B2 | 7/2022 | Kurihara et al. |
| 2012/0161590 | A1 | 6/2012 | Yamasaki et al. |
| 2016/0036305 | A1 | 2/2016 | Kawata et al. |
| 2018/0093698 | A1 | 4/2018 | Urimoto et al. |
| 2019/0103787 | A1 | 4/2019 | Maeshima |
| 2020/0023886 | A1 | 1/2020 | Yatsugi et al. |
| 2020/0366166 | A1 | 11/2020 | Kurihara et al. |
| 2021/0075301 | A1 | 3/2021 | Ichikawa et al. |
| 2022/0278594 | A1 | 9/2022 | Nakano et al. |
| 2023/0081123 | A1 | 3/2023 | Morimoto |
| 2023/0179070 | A1 | 6/2023 | Morimoto |

FOREIGN PATENT DOCUMENTS

| | | | | |
|---|---|---|---|---|
| CN | 108028579 | A | | 5/2018 |
| CN | 112039407 | A | | 12/2020 |
| CN | 114270675 | A | | 4/2022 |
| CN | 115211002 | A | | 10/2022 |
| DE | 102015226506 | B4 | | 6/2016 |
| JP | 2016-034204 | A | | 3/2016 |
| JP | 2016-036244 | A | | 3/2016 |
| JP | 2018-050410 | A | | 3/2018 |
| JP | 2018-207640 | A | | 12/2018 |
| JP | 2020-188656 | A | | 11/2020 |
| WO | 2017/046940 | A1 | | 3/2017 |
| WO | 2017/068636 | A1 | | 4/2017 |
| WO | WO-2018221726 | A1 * | 12/2018 | ........... B62D 5/0406 |
| WO | WO-2020039572 | A1 * | 2/2020 | ............. B60R 16/03 |
| WO | WO-2022172974 | A1 * | 8/2022 | ........... B62D 5/0406 |

OTHER PUBLICATIONS

Written Opinion for PCT/JP2023/038657, Jan. 16, 2024.
Communication dated Jul. 1, 2025, from The China National Intellectual Property Administration in Application No. 2023800037108.5.
European Patent Office Action dated Aug. 11, 2025, issued in European application No. 23885638.9.
European Search Report dated Jul. 30, 2025, issued in European application No. 23885638.9.

* cited by examiner

ELECTRIC DRIVE DEVICE AND ELECTRIC POWER STEERING DEVICE

CROSS REFERENCE TO RELATED APPLICATIONS

This application is a National Stage of International Application No. PCT/JP2023/038657 filed Oct. 26, 2023, claiming priority based on Japanese Patent Application No. 2022-175020 filed Oct. 31, 2022.

FIELD

The present disclosure relates to an electric drive device and an electric power steering device including an electronic control device that controls rotation of a motor.

BACKGROUND

An electric power steering device that generates auxiliary steering torque with a motor includes an electronic control device that is a device that controls the motor (see Patent Literature 1 and Patent Literature 2).

CITATION LIST

Patent Literature

Patent Literature 1: JP 2016-036244 A
Patent Literature 2: JP 2020-188656 A

SUMMARY

Technical Problem

The electric drive devices of Patent Literature 1 and Patent Literature 2 include a shunt resistor that detects a current flowing through a motor coil. The detection value detected by the shunt resistor is amplified by a signal amplifier circuit.

A control circuit performs feedback control on the current to be supplied to the motor coil based on the detection value detected by the shunt resistor. Thus, it is desirable that less noise is superimposed on the detection value detected by the shunt resistor in the path from the shunt resistor to the control circuit.

The present disclosure has been made in view of the above issue, and an object of the present disclosure is to provide an electric drive device and an electric power steering device that reduce noise superimposed on a detection value detected by a current detection element in a path from the current detection element to a control circuit.

Solution to Problem

To achieve the above object, an electric drive device according to an embodiment comprising:
  a shaft extending in an axial direction from a load side to an anti-load side;
  a motor rotor interlocked with the shaft;
  a motor stator including a stator core that rotates the motor rotor and a plurality of coil groups that are divided into at least two systems of coil groups of a first coil group and a second coil group for every three phases and excite the stator core with three-phase alternating current;
  an electric motor including a housing having a tubular shape that accommodates the motor rotor, the motor stator, and the plurality of coil groups inside;
  a magnet provided at an end on the anti-load side of the shaft to drive and control the electric motor;
  an electronic control device including one circuit board disposed on the anti-load side of the shaft and on an extension line in the axial direction of the shaft;
  a heat sink disposed between the circuit board and the electric motor; and
  a connector including a terminal connected to the circuit board,
  the circuit board including:
    a disposition area for a detection circuit that is on an extension line in the axial direction of the magnet, is attached to the circuit board, and includes a magnetic sensor that detects rotation of the magnet;
    a mounting area for a plurality of drive elements of a first inverter circuit that supplies a current to the first coil group;
    a mounting area for a plurality of drive elements of a second inverter circuit that supplies a current to the second coil group;
    a mounting area for a first current detection element that detects a current flowing through the first inverter circuit;
    a mounting area for a second current detection element that detects a current flowing through the second inverter circuit;
    a mounting area for a first motor driver circuit including a first current detection circuit that amplifies a detection value detected by the first current detection element, and a first gate driver circuit that drives the plurality of drive elements of the first inverter circuit;
    a mounting area for a second motor driver circuit including a second current detection circuit that amplifies a detection value detected by the second current detection element, and a second gate driver circuit that drives the plurality of drive elements of the second inverter circuit;
    a mounting area for a control circuit that controls the first gate driver circuit based on a current value obtained by amplifying, with the first current detection circuit, the detection value detected by the first current detection element, and controls the second gate driver circuit based on a current value obtained by amplifying, with the second current detection circuit, the detection value detected by the second current detection element;
    a disposition area for a first coil wiring in which each first coil wiring of the first coil group is connected to a board body of the circuit board; and
    a disposition area for a second coil wiring in which each second coil wiring of the second coil group is connected to the board body of the circuit board, wherein
  the mounting area for the first motor driver circuit, the mounting area for the first current detection element, the mounting area for the plurality of drive elements of the first inverter circuit, and the disposition area for the first coil wiring are disposed in order from a reference position to one side in a first direction with a position on an extension line in the axial direction of the shaft as the reference position,
  the mounting area for the second motor driver circuit, the mounting area for the second current detection element, the mounting area for the plurality of drive elements of the second inverter circuit, and the disposition area for the second coil wiring are disposed in this order from the reference position to the other side in the first direction, and the mounting area for the control circuit and the terminal of the connector sandwich the reference position in a second direction intersecting the first direction.

A mounting area for a first motor driver circuit and a mounting area for a first current detection element are adjacent to each other. A mounting area for a second motor driver circuit and a mounting area for a second current detection element are adjacent to each other. With this configuration, since the wiring between the first motor driver circuit and the first current detection element is shortened, noise in signal amplification in the first motor driver circuit is reduced. Since the wiring between the second motor driver circuit and the second current detection element is shortened, noise in signal amplification in the second motor driver circuit is reduced. In this manner, an electric drive device can reduce noise superimposed on a detection value detected by a current detection element in a path from the current detection element to a control circuit. As a result, the control circuit drives the electric motor based on the current value with less noise, and thus the torque ripple generated in a motor rotor is suppressed.

As a preferable embodiment, the first current detection element detects a current flowing through a drive element of a lower arm among the plurality of drive elements of the first inverter circuit, and the second current detection element detects a current flowing through a drive element of a lower arm among the plurality of drive elements of the second inverter circuit.

With this configuration, the mounting area for the first current detection element and the mounting area for the drive element of the first inverter circuit are adjacent to each other, and thus the wiring between the first current detection element and the drive element of the first inverter circuit can be shortened. The mounting area for the second current detection element and the mounting area for the drive element of the second inverter circuit are adjacent to each other, and thus the wiring between the second current detection element and the drive element of the second inverter circuit can be shortened.

As a preferable embodiment, the circuit board further includes a power circuit area in which a noise filter circuit and a power supply circuit are disposed, and the power circuit area is disposed between the reference position and the terminal of the connector in the second direction.

This allows a power circuit area to be disposed in the vicinity of a connector terminal without a large difference between the distance of the wiring to the first inverter circuit and the distance of the wiring to the second inverter circuit.

As a preferable embodiment, the first motor driver circuit includes a booster circuit that generates a gate voltage boosted for driving the plurality of drive elements of the first inverter circuit, and the second motor driver circuit includes a booster circuit that generates a gate voltage boosted for driving the plurality of drive elements of the second inverter circuit.

As compared with Patent Literature 1 and Patent Literature 2, it is possible to shorten the distance of the wiring between the first motor driver circuit and the plurality of drive elements of the first inverter circuit and the distance of the wiring between the second motor driver circuit and the plurality of drive elements of the second inverter circuit. As a result, the influence of the time constant on the signal waveform of the gate voltage given by the wiring resistance is small, and the first inverter circuit and the second inverter circuit can be driven even when the gate voltage generated by the booster circuit is suppressed. Then, the drive elements of the first inverter circuit and the second inverter circuit are likely to stably operate at high speed.

As a preferable embodiment, a plurality of the first coil wirings are arranged in the second direction, and a plurality of the second coil wirings are arranged in the second direction to have a phase arrangement of the plurality of second coil wirings in an order opposite to a phase arrangement of the plurality of the first coil wirings.

This causes the power supply systems that supply power from the connector to the coil groups of the two systems to be equal for each coil group.

As a preferable embodiment, the board body of the circuit board is a double-sided mounting board, and the plurality of drive elements of the first inverter circuit and the plurality of drive elements of the second inverter circuit are mounted on a first surface of the board body of the circuit board facing the heat sink, and the first motor driver circuit and the second motor driver circuit are mounted on a second surface of the board body of the circuit board on a side opposite to the first surface.

The first motor driver circuit and the plurality of drive elements of the first inverter circuit are electrically connected via an internal conductive layer of a circuit board. The second motor driver circuit and the plurality of drive elements of the second inverter circuit are electrically connected via an internal conductive layer of the circuit board. This makes it possible to reduce the size of the circuit board. In addition, since the heat generated by the plurality of drive elements of the first inverter circuit and the plurality of drive elements of the second inverter circuit is dissipated by a heat sink, the reliability of the electric drive device is improved.

As a preferable embodiment, an electric power steering device comprising the electric drive device, wherein the electric drive device generates auxiliary steering torque.

This suppresses the torque ripple of the electric motor and improves the operability of the electric power steering device.

Advantageous Effects of Invention

The present disclosure can provide an electric drive device and an electric power steering device that reduce noise superimposed on a detection value detected by a current detection element in a path from the current detection element to a control circuit.

DESCRIPTION OF EMBODIMENTS

Modes (embodiments) for carrying out the present disclosure will be described in detail with reference to the drawings. The present disclosure is not limited by the contents described in the following embodiments. The constituent elements described below include those that can be easily assumed by the person skilled in the art and those that are substantially the same. The constituent elements described below can be appropriately combined.

First Embodiment

Figure 1:
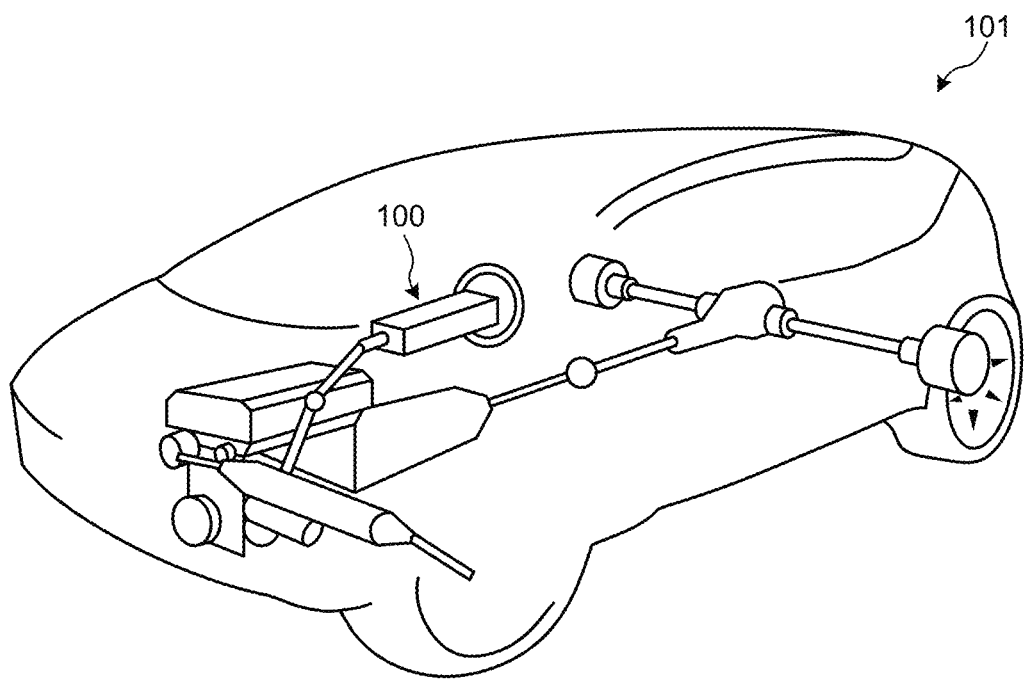
FIG. 1 is a perspective view schematically illustrating a vehicle equipped with an electric power steering device according to a first embodiment.
Figure 2:
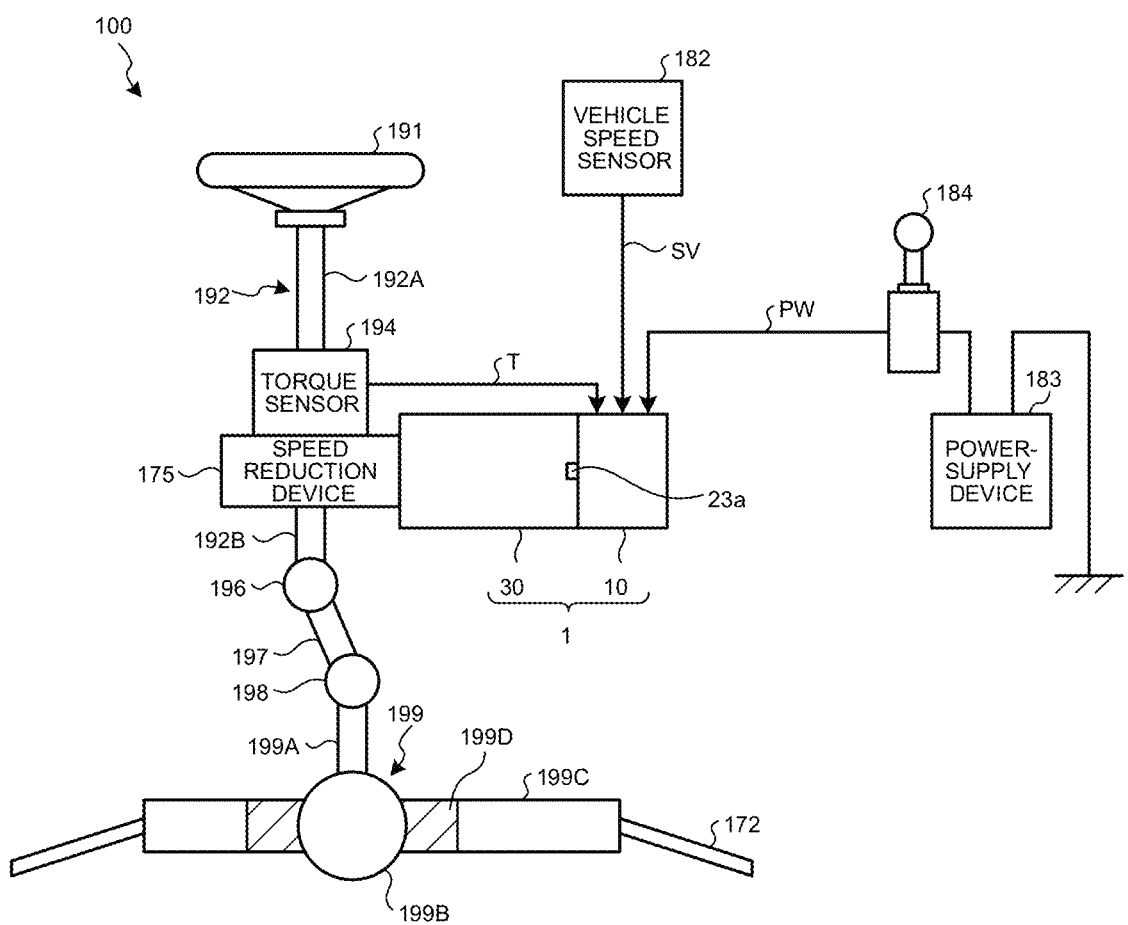
FIG. 2 is a schematic diagram of the electric power steering device according to the first embodiment.

FIG. 1 is a perspective view schematically illustrating a vehicle equipped with an electric power steering device according to a first embodiment. FIG. 2 is a schematic diagram of the electric power steering device according to the first embodiment. As illustrated in FIG. 1, a vehicle 101 is equipped with an electric power steering device 100. An outline of the electric power steering device 100 will be described with reference to FIG. 2.

The electric power steering device 100 includes a steering wheel 191, a steering shaft 192, a universal joint 196, an intermediate shaft 197, a universal joint 198, a first rack-and-pinion mechanism 199, and a tie rod 172 in this order in which force applied from a driver (operator) is transmitted. The electric power steering device 100 further includes a torque sensor 194 that detects the steering torque of the steering shaft 192, an electric motor 30, an electronic control device (hereinafter, it is referred to as an electronic control unit (ECU)) 10 that controls the electric motor 30, and a speed reduction device 75. A vehicle speed sensor 182, a power-supply device 183 (for example, an in-vehicle battery), and an ignition switch 184 are provided in the vehicle body. The vehicle speed sensor 182 detects a traveling speed of the vehicle 101. The vehicle speed sensor 182 outputs the detected vehicle speed signal SV to the ECU 10 through controller area network (CAN) communication. Power is supplied from the power-supply device 183 to the ECU 10 in a state where the ignition switch 184 is turned on.

As illustrated in FIG. 2, the steering shaft 192 includes an input shaft 192A and an output shaft 192B. The input shaft 192A has one end connected to the steering wheel 191 and the other end connected to a torsion bar. The output shaft 192B has one end connected to the torsion bar, and the other end connected to the universal joint 196. The torque sensor 194 detects the steering torque applied to the steering shaft 192 by detecting the torsion of the torsion bar. The torque sensor 194 outputs a steering torque signal T corresponding to the detected steering torque to the ECU 10. The steering shaft 192 is rotated by a steering force applied to the steering wheel 191.

The intermediate shaft 197 transmits the torque of the output shaft 192B. The first rack-and-pinion mechanism 199 includes a first pinion shaft 199A, a first pinion gear 199B, a rack shaft 199C, and a first rack 199D. The first pinion shaft 199A has one end connected to the intermediate shaft 197 via the universal joint 198 and the other end connected to the first pinion gear 199B. The first rack 199D formed on the rack shaft 199C meshes with the first pinion gear 199B.

As described above, the rotational motion of the steering shaft 192 is transmitted to the first rack-and-pinion mechanism 199 via the intermediate shaft 197. This rotational motion is converted into linear motion of the rack shaft 199C by the first rack-and-pinion mechanism 199. The tie rods 172 are connected to both ends of the rack shaft 199C.

The electric motor 30 is a motor that generates auxiliary steering torque for assisting the steering of the driver. The electric motor 30 may be a brushless motor or a brush motor having a brush and a commutator.

The ECU 10 includes a rotation angle sensor 23a. The rotation angle sensor 23a detects a rotation phase of the electric motor 30. The ECU 10 acquires a rotation phase signal of the electric motor 30 from the rotation angle sensor 23a, acquires the steering torque signal T from the torque sensor 194, and acquires the vehicle speed signal SV of the vehicle 101 from the vehicle speed sensor 182. The ECU 10 calculates an auxiliary steering command value of an assist command based on the rotation phase signal, the steering torque signal T, and the vehicle speed signal SV. The ECU 10 supplies a current to the electric motor 30 based on the calculated auxiliary steering command value.

An electric drive device 1 includes the electric motor 30 and the ECU 10 fixed to a shaft of the electric motor 30 on an anti-load side. The electric drive device 1 may include an adapter that connects the ECU 10 and the electric motor 30.

The speed reduction device 75 includes a worm shaft that rotates integrally with a shaft 31 of the electric motor 30, and a worm wheel that meshes with the worm shaft. Thus, the rotational movement of the shaft of the electric motor 30 is transmitted to the worm wheel via the worm shaft. In the first embodiment, the end of the shaft of the motor on a speed reduction device 175 side is referred to as a load-side end, and the end of the shaft of the motor on the side opposite to the speed reduction device 175 is referred to as an anti-load-side end.

The steering force of the driver input to the steering wheel 191 is transmitted to the first rack-and-pinion mechanism 199 via the steering shaft 192 and the intermediate shaft 197. The first rack-and-pinion mechanism 199 transmits the transmitted steering force to the rack shaft 199C as a force applied in an axial direction of the rack shaft 199C. At this time, the ECU 10 acquires the steering torque signal T input to the steering shaft 192 from the torque sensor 194. The ECU 10 acquires the vehicle speed signal SV from the vehicle speed sensor 182. The ECU 10 acquires the rotation phase signal of the electric motor 30 from the rotation angle sensor 23a. Then, the ECU 10 outputs a control signal to control the operation of the electric motor 30. The auxiliary steering torque generated by the electric motor 30 is transmitted to the output shaft 192B via the speed reduction device 75. The driver's steering of the steering wheel 191 is thus assisted by the electric power steering device 100.

As illustrated in FIG. 2, the electric power steering device 100 is a column assist type electric power steering device in which an assist force is applied to the output shaft 192B of the steering shaft 192.

Figure 3:
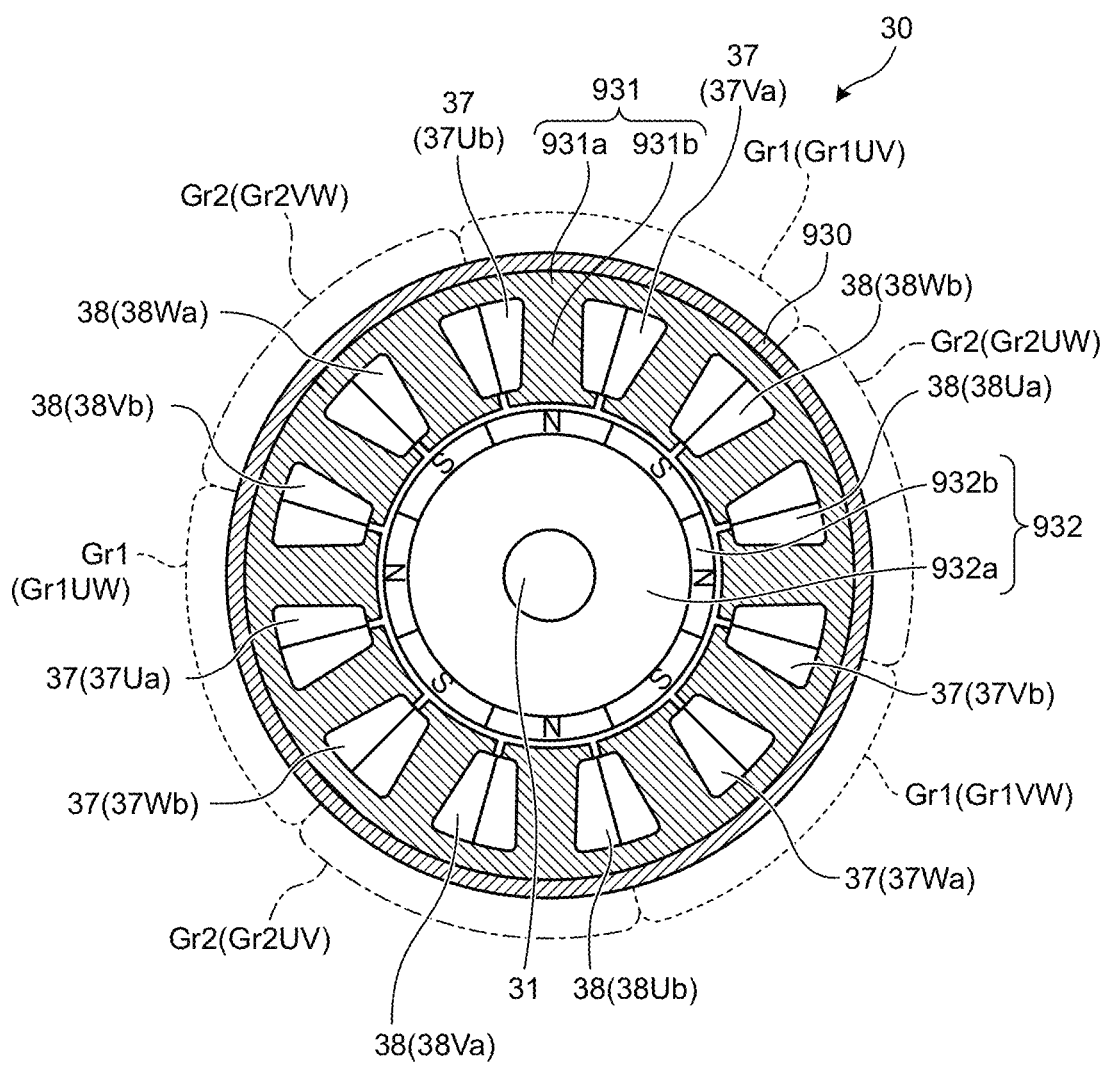
FIG. 3 is a sectional view schematically illustrating a section of a motor according to the first embodiment.
Figure 4:
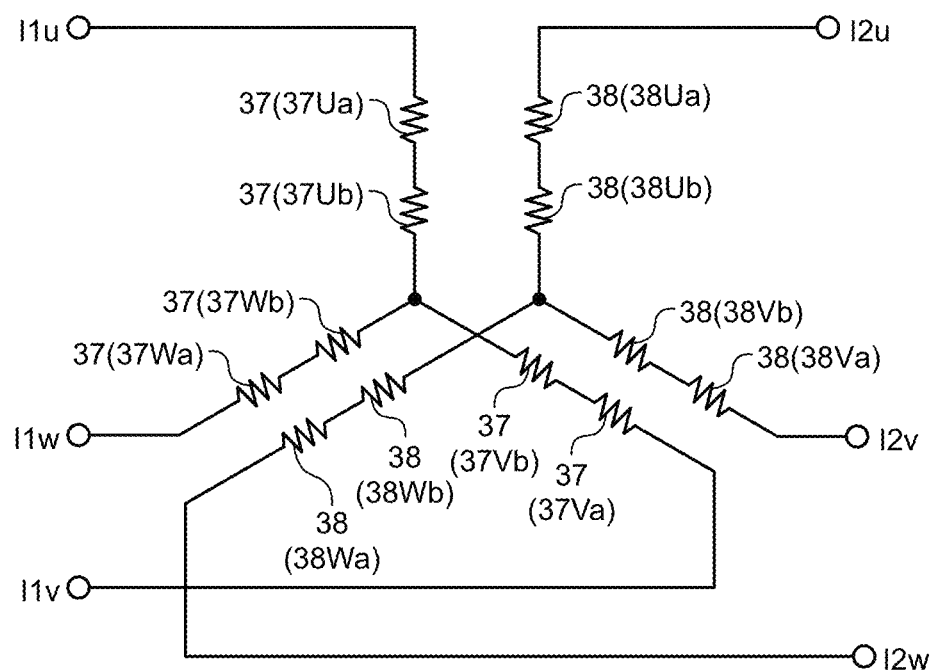
FIG. 4 is a schematic diagram illustrating wiring of the motor according to the first embodiment.

FIG. 3 is a sectional view schematically illustrating a section of a motor according to the first embodiment. FIG. 4 is a schematic diagram illustrating wiring of the motor according to the first embodiment. In the first embodiment, a circumferential direction is a direction along a concentric circle centered on the shaft 31. A radial direction is a direction away from the shaft 31 in a plane orthogonal to an axial direction Ax. As illustrated in FIG. 3, the electric motor 30 includes a housing 930, a motor stator having a stator core 931, and a motor rotor 932. The motor stator includes a stator core 931 having a cylindrical shape, a plurality of first coils 37, and a plurality of second coils 38. The stator core 931 includes an annular back yoke 931a and a plurality of teeth 931b protruding from an inner circumferential surface of the back yoke 931a. Twelve teeth 931b are disposed in the circumferential direction. The motor rotor 932 includes a rotor yoke 932a and a magnet 932b. The magnet 932b is provided on the outer circumferential surface of the rotor yoke 932a. The number of magnets 932b is, for example, 8. The rotation of the motor rotor 932 is interlocked with the rotation of the shaft 31.

As illustrated in FIG. 3, the first coil 37 is concentratedly wound around each one of the plurality of teeth 931b. The first coil 37 is concentratedly wound around the outer periphery of the tooth 931b via an insulator. All the first coils 37 are included in a first coil system. In the first coil system according to the first embodiment, a current is supplied and excited by a first inverter circuit 251A (see FIG. 5) included in a first power circuit 25A. The first coil system includes, for example, six first coils 37. The six first coils 37 are disposed such that two first coils 37 are adjacent to each other in a circumferential direction. Three first coil groups Gr1 in which adjacent first coils 37 form one group are disposed at equal intervals in the circumferential direction. That is, the first coil system includes the three first coil groups Gr1 disposed at equal intervals in the circumferential direction. The number of the first coil groups Gr1 is not necessarily three but may take any numbers as long as 3n of first coil groups Gr1 are disposed at equal intervals in the circumferential direction when n is a natural number. In addition, n is desirably an odd number. As described above, in the first embodiment, there are a plurality of coil groups, the coil groups are divided into at least two systems of the first coil group Gr1 and the second coil group Gr2 for every three phases, and the stator core is excited by three-phase alternating current.

As illustrated in FIG. 3, the second coil 38 is concentratedly wound around each one of the plurality of teeth 931b. The second coil 38 is concentratedly wound around the outer periphery of the tooth 931b via an insulator. The tooth 931b around which the second coil 38 is concentratedly wound is a different tooth 931b from the tooth 931b around which the first coil 37 is concentratedly wound. All the second coils 38 are included in the second coil system. In the second coil system, a current is supplied and excited by a second inverter circuit 251B (see FIG. 5) included in a second power circuit 25B. The second coil system includes, for example, six second coils 38. The six second coils 38 are disposed such that two second coils 38 are adjacent to each other in the circumferential direction. Three second coil groups Gr2 in which adjacent second coils 38 form one group are disposed at equal intervals in the circumferential direction. That is, the second coil system includes three second coil groups Gr2 disposed at equal intervals in the circumferential direction. The number of the second coil groups Gr2 is not necessarily three but may take any numbers as long as 3n of second coil groups Gr2 are disposed at equal intervals in the circumferential direction when n is a natural number. In addition, n is desirably an odd number.

As illustrated in FIG. 4, the six first coils 37 include two first U-phase coils 37Ua and 37Ub excited by a first U-phase current I1u, two first V-phase coils 37Va and 37Vb excited by a first V-phase current I1v, and two first W-phase coils 37Wa and 37Wb excited by a first W-phase current I1w. The first U-phase coil 37Ub is connected in series to the first U-phase coil 37Ua. The first V-phase coil 37Vb is connected in series to the first V-phase coil 37Va. The first W-phase coil 37Wb is connected in series to the first W-phase coil 37Wa. The winding directions of the first coil 37 with respect to the teeth 931b are all the same. The first U-phase coil 37Ub, the first V-phase coil 37Vb, and the first W-phase coil 37Wb are joined in a star connection (Y connection).

As illustrated in FIG. 4, the six second coils 38 include two second U-phase coils 38Ua and 38Ub excited by a second U-phase current I2u, two second V-phase coils 38Va and 38Vb excited by a second V-phase current I2v, and two second W-phase coils 38Wa and 38Wb excited by a second W-phase current I2w. The second U-phase coil 38Ub is connected in series to the second U-phase coil 38Ua. The second V-phase coil 38Vb is connected in series to the second V-phase coil 38Va. The second W-phase coil 38Wb is connected in series to the second W-phase coil 38Wa. The winding directions of the second coil 38 with respect to the teeth 931b are all the same, and are the same as the winding direction of the first coil 37. The second U-phase coil 38Ub, the second V-phase coil 38Vb, and the second W-phase coil 38Wb are joined in a star connection (Y connection).

As illustrated in FIG. 3, the three first coil groups Gr1 include a first UV coil group Gr1UV, a first VW coil group Gr1VW, and a first UW coil group Gr1UW. The first UV coil group Gr1UV includes the first U-phase coil 37Ub and the first V-phase coil 37Va adjacent to each other in the circumferential direction. The first VW coil group Gr1VW includes the first V-phase coil 37Vb and the first W-phase coil 37Wa adjacent to each other in the circumferential direction. The first UW coil group Gr1UW includes the first U-phase coil 37Ua and the first W-phase coil 37Wb adjacent to each other in the circumferential direction.

As illustrated in FIG. 3, the three second coil groups Gr2 include a second UV coil group Gr2UV, a second VW coil group Gr2VW, and a second UW coil group Gr2UW. The second UV coil group Gr2UV includes the second U-phase coil 38Ub and the second V-phase coil 38Va adjacent to each other in the circumferential direction. The second VW coil group Gr2VW includes the second V-phase coil 38Vb and the second W-phase coil 38Wa adjacent to each other in the circumferential direction. The second UW coil group Gr2UW includes the second U-phase coil 38Ua and the second W-phase coil 38Wb adjacent to each other in the circumferential direction.

The first coil 37 excited by the first U-phase current I1u faces the second coil 38 excited by the second U-phase current I2u in the radial direction of the stator core 931. In the following description, the radial direction of the stator core 931 is simply referred to as the radial direction. For example, as illustrated in FIG. 3, in the radial direction, the first U-phase coil 37Ua faces the second U-phase coil 38Ua, and the first U-phase coil 37Ub faces the second U-phase coil 38Ub.

The first coil 37 excited by the first V-phase current I1v faces the second coil 38 excited by the second V-phase current I2v in the radial direction. For example, as illustrated in FIG. 3, in the radial direction, the first V-phase coil 37Va faces the second V-phase coil 38Va, and the first V-phase coil 37Vb faces the second V-phase coil 38Vb.

The first coil 37 excited by the first W-phase current I1w faces the second coil 38 excited by the second W-phase current I2w in the radial direction. For example, as illustrated in FIG. 3, in the radial direction, the first W-phase coil 37Wa faces the second W-phase coil 38Wa, and the first W-phase coil 37Wb faces the second W-phase coil 38Wb.

Figure 5:
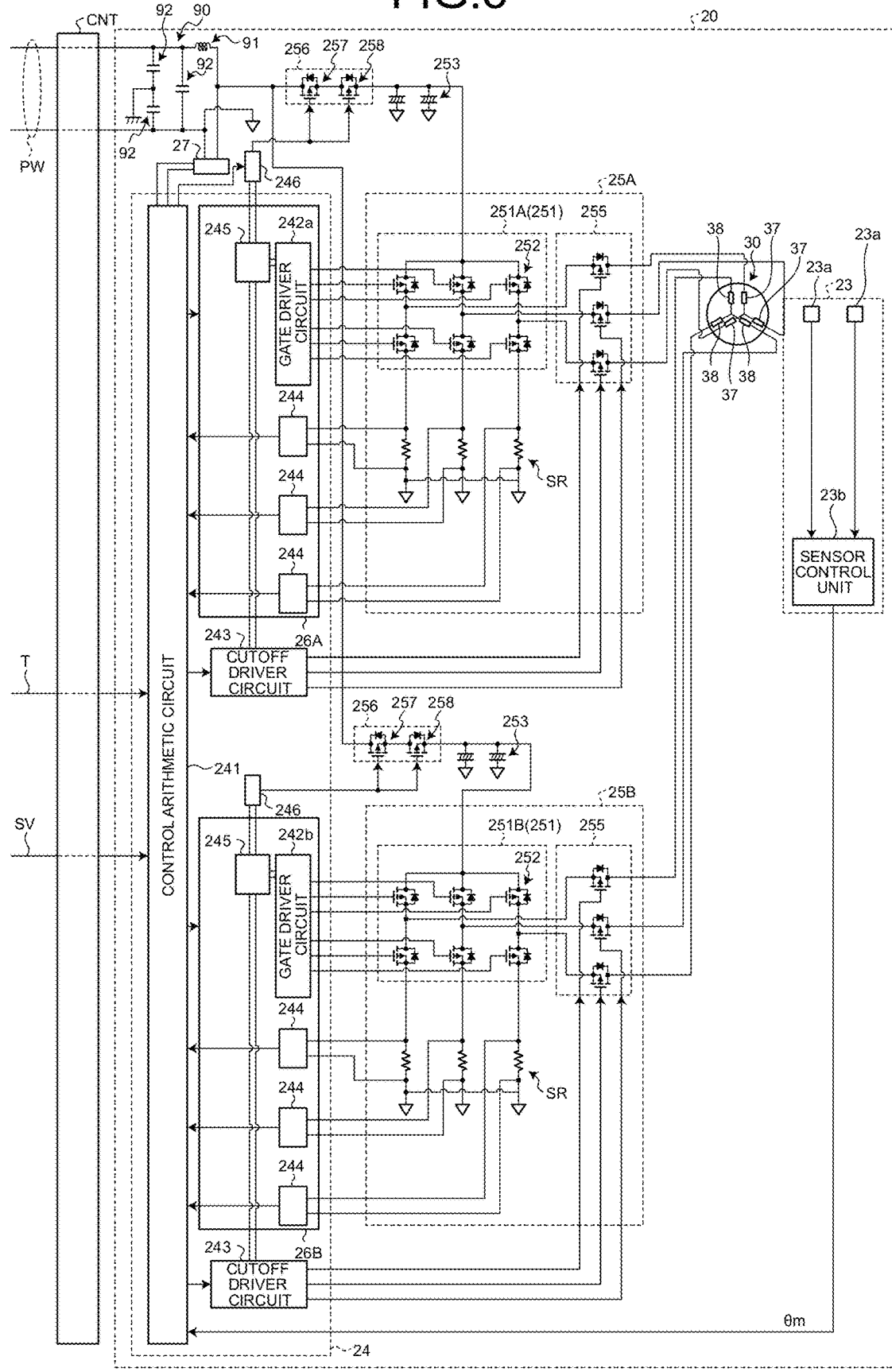
FIG. 5 is a schematic diagram illustrating a relationship between the motor according to the first embodiment and an ECU.

FIG. 5 is a schematic diagram illustrating a relationship between the motor according to the first embodiment and the ECU. As illustrated in FIG. 5, the ECU 10 includes a detection circuit 23, a control circuit 24, a first power circuit 25A, a second power circuit 25B, a power management circuit 27, a cutoff driver circuit 243, and a power relay driver circuit 246. In FIG. 5, circuits that do not need to be described are appropriately omitted.

The control circuit 24 includes a control arithmetic circuit 241, a first motor driver circuit 26A, and a second motor driver circuit 26B. Input and output signals such as the steering torque signal T and the vehicle speed signal SV are transmitted to the control arithmetic circuit 241 via a connector CNT. Since a circuit board 20 is a multilayer resin board provided with a plurality of conductive layers, the connection wiring electrically connected from the connector CNT to the control arithmetic circuit 241 of the control circuit 24 is routed in an internal conductive layer of the circuit board 20.

A wiring PW from the power-supply device 183 is supplied with power via the connector CNT. A noise filter circuit 90 includes a choke coil 91 and a capacitor 92, and removes a high-frequency component superimposed on power supplied from the wiring PW. A connection wiring PWS routed to the circuit board 20 is connected to the wiring PW from the power-supply device 183. One end of the connection wiring PWS is connected to the noise filter circuit 90 (choke coil 91, capacitor 92), and the other end of the connection wiring is connected to the first inverter circuit 251A of the first power circuit 25A or the second inverter circuit 251B of the second power circuit 25B via a power supply circuit 256. When the first inverter circuit 251A and the second inverter circuit 251B will be described without distinction, they will be simply described as an inverter circuit 251.

The power supply circuit 256 is disposed between the noise filter circuit 90 and the inverter circuit 251. The power supply circuit 256 includes a power cutoff element 257 and a reverse connection protection element 258. The power cutoff element 257 and the reverse connection protection element 258 are field effect transistors (FETs). The forward direction of the parasitic diode of the reverse connection protection element 258 is opposite to the forward direction of the parasitic diode of the power cutoff element 257. Thus, even when the power of the opposite polarity is erroneously supplied from the power-supply device 183, the reverse connection protection element 258 cuts off the power of the opposite polarity and protects the inverter circuit 251.

The power management circuit 27 is a switching IC that controls ON/OFF of a power supply of a circuit mounted on the circuit board 20 and distribution of power distribution. The power management circuit 27 controls, for example, distribution of power to be used by the control circuit 24. One end of the connection wiring is connected to the noise filter circuit 90 (choke coil 91, capacitor 92), and the other end of the connection wiring is connected to the power management circuit 27.

The detection circuit 23 includes two rotation angle sensors 23a and a sensor control unit 23b. The detection circuit 23 can continue its function even when one rotation angle sensor 23a fails. The first power circuit 25A includes a first inverter circuit 251A and a current cutoff circuit 255. The second power circuit 25B includes a second inverter circuit 251B and a current cutoff circuit 255.

The first motor driver circuit 26A includes a first gate driver circuit 242a, a plurality of first current detection circuits 244, and a booster circuit 245. The second motor driver circuit 26B includes a second gate driver circuit 242b, a plurality of second current detection circuits 244, and a booster circuit 245. The booster circuit 245 supplies boosted power to the first gate driver circuit 242a, the second gate driver circuit 242b, the cutoff driver circuit 243, and the power relay driver circuit 246.

When the power relay driver circuit 246 conducts the power cutoff element 257 and the reverse connection protection element 258 under the control of the control arithmetic circuit 241, the power from the power-supply device 183 is supplied to each inverter circuit 251.

The inverter circuit 251 includes a plurality of drive elements 252. The drive element 252 is a field effect transistor (FET), and is also referred to as a switching element. The drive element 252 connected to the high potential side constitutes an upper arm, and the drive element 252 connected to the low potential side constitutes a lower arm. A shunt resistor SR is connected to each of the three drive elements 252 of the lower arm. One shunt resistor SR is connected to each of the three drive elements 252, but only one shunt resistor SR may be connected to the three drive elements 252.

The control arithmetic circuit 241 controls the first motor driver circuit 26A or the second motor driver circuit 26B. For example, the control arithmetic circuit 241 calculates a motor current command value and controls the first motor driver circuit 26A or the second motor driver circuit 26B with the motor current command value. The sensor control unit 23b calculates a motor electrical angle θm based on the detection value of the rotation angle sensor 23a, and outputs the motor electrical angle θm to the control arithmetic circuit 241. A first gate driver circuit 242 controls the first power circuit 25A based on the motor current command value. The second gate driver circuit 242b controls the second power circuit 25B based on the motor current command value. In this manner, the current flowing to the first coil 37 and the current flowing to the second coil 38 are individually controlled by the control arithmetic circuit 241.

As illustrated in FIG. 5, the ECU 10 includes the rotation angle sensor 23a. The rotation angle sensor 23a is, for example, a magnetic sensor. The detection value of the rotation angle sensor 23a is supplied to the sensor control unit 23b. The sensor control unit 23b outputs an output value corresponding to the motor electrical angle θm to the control arithmetic circuit 241 based on the detection value of the rotation angle sensor 23a.

The control arithmetic circuit 241 receives the steering torque signal T detected by the torque sensor 194, the vehicle speed signal SV detected by the vehicle speed sensor 82, and the output value corresponding to the motor electrical angle θm output from the sensor control unit 23b. The control arithmetic circuit 241 calculates a motor current command value based on the motor electrical angle θm calculated from the steering torque signal T, the vehicle speed signal SV, and the above output value, and outputs the motor current command value to the first gate driver circuit 242a and the second gate driver circuit b.

The first gate driver circuit 242a calculates a first pulse width modulation signal based on the motor current command value, and outputs a gate drive signal to the first inverter circuit 251A of the first power circuit 25A. The gate drive signal is a pulse signal generated based on the gate voltage boosted by the booster circuit 245. The first inverter circuit 251A generates a three-phase AC including the first U-phase current I1u, the first V-phase current I1v, and the first W-phase current I1w by switching the drive element 252 so as to have three-phase current values according to the duty ratio of the first pulse width modulation signal. The first U-phase current I1u excites the first U-phase coil 37Ua and the first U-phase coil 37Ub, the first V-phase current I1v excites the first V-phase coil 37Va and the first V-phase coil 37Vb, and the first W-phase current I1w excites the first W-phase coil 37Wa and the first W-phase coil 37Wb.

The second gate driver circuit 242b calculates a second pulse width modulation signal based on the motor current command value, and outputs a gate drive signal to the second inverter circuit 251b of the second power circuit 25B. The gate drive signal is generated based on the voltage boosted by the booster circuit 245. The second inverter circuit 251b generates a three-phase AC including the second U-phase current I2u, the second V-phase current I2v, and the second W-phase current I2w by switching the drive element 252 so as to have three-phase current values according to the duty ratio of the second pulse width modulation signal. The second U-phase current I2u excites the second U-phase coil 38Ua and the second U-phase coil 38Ub, the second V-phase current I2v excites the second V-phase coil 38Va and the second V-phase coil 38Vb, and the second W-phase current I2w excites the second W-phase coil 38Wa and the second W-phase coil 38Wb.

The inverter circuit 251 is a power conversion circuit that converts DC power into AC power. As described above, the inverter circuit 251 includes a plurality of drive elements 252. The drive element 252 is, for example, a field effect transistor. A capacitor 253 for smoothing is connected in parallel to the inverter circuit 251. The capacitor 253 is, for example, an electrolytic capacitor. In other words, the circuit board 20 includes a plurality of electrolytic capacitors connected in parallel.

The current detection circuit 244 is connected to, for example, the shunt resistor SR. The shunt resistor SR is an example of a current detection element. The current detection element may be a Hall element or the like. The current detection circuit 244 includes a differential amplifier circuit using an operational amplifier and a low-pass filter. The differential amplifier circuit of the current detection circuit 244 performs signal amplification on the detection value detected by the shunt resistor SR, attenuates a component higher than the cutoff frequency through the low-pass filter, and sends the detection value detected by the shunt resistor SR to the control arithmetic circuit 241 as a current value.

The current cutoff circuit 255 is disposed between the inverter circuit 251 and the first coil 37 or the second coil 38. When the current value detected by the current detection circuit 244 is determined to be abnormal, the control arithmetic circuit 241 can drive the current cutoff circuit 255 via the cutoff driver circuit 243 to cut off the current flowing from the inverter circuit 251 to the first coil 37. The control arithmetic circuit 241 can drive the current cutoff circuit 255 via the cutoff driver circuit 243 to cut off the current flowing from the inverter circuit 251 to the second coil 38. When the current value detected by the current detection circuit 244 is determined to be abnormal, the control arithmetic circuit 241 makes the power cutoff element 257 and the reverse connection protection element 258 non-conductive via the power relay driver circuit 246 to protect the inverter circuit 251.

Figure 6:
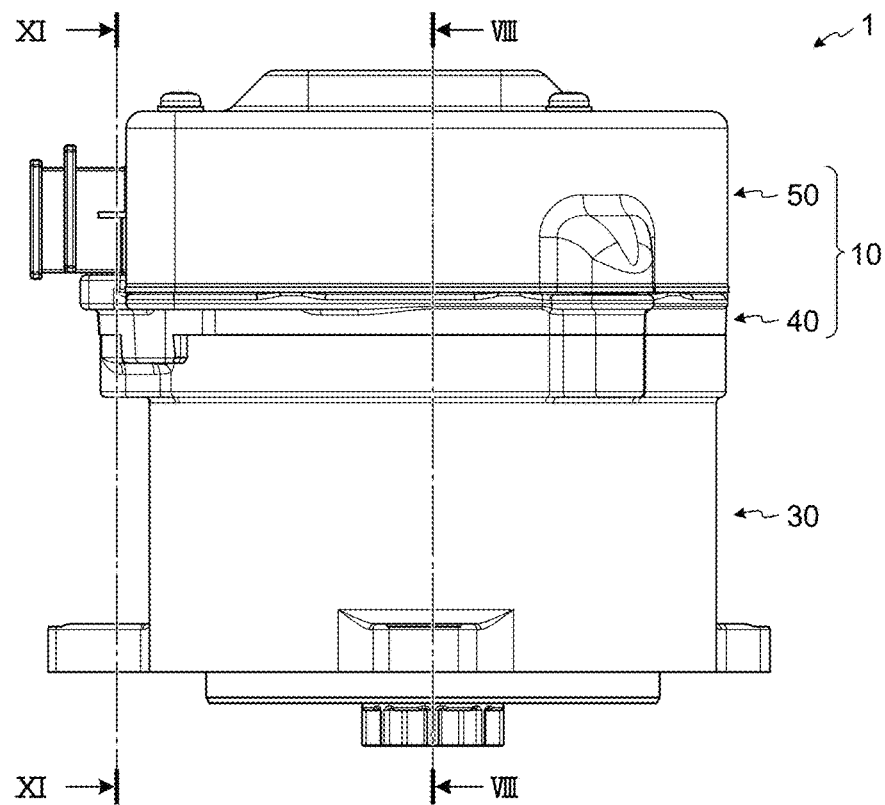
FIG. 6 is a side view of an electric drive device according to the first embodiment.
Figure 7:
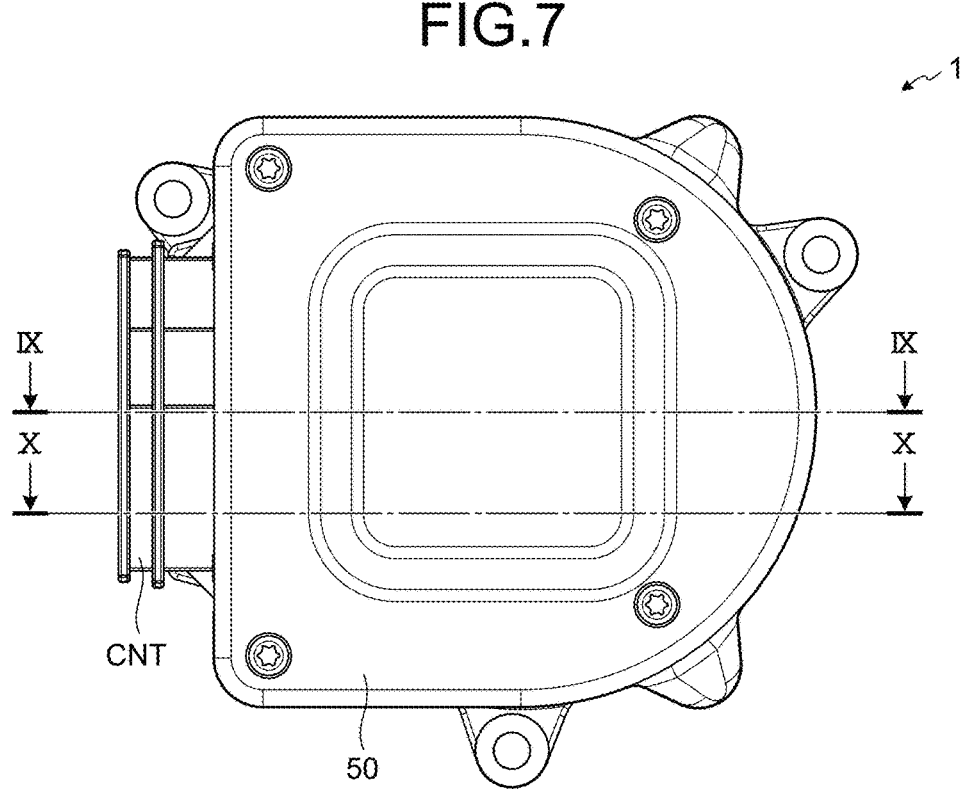
FIG. 7 is a plan view of the electric drive device according to the first embodiment.
Figure 8:
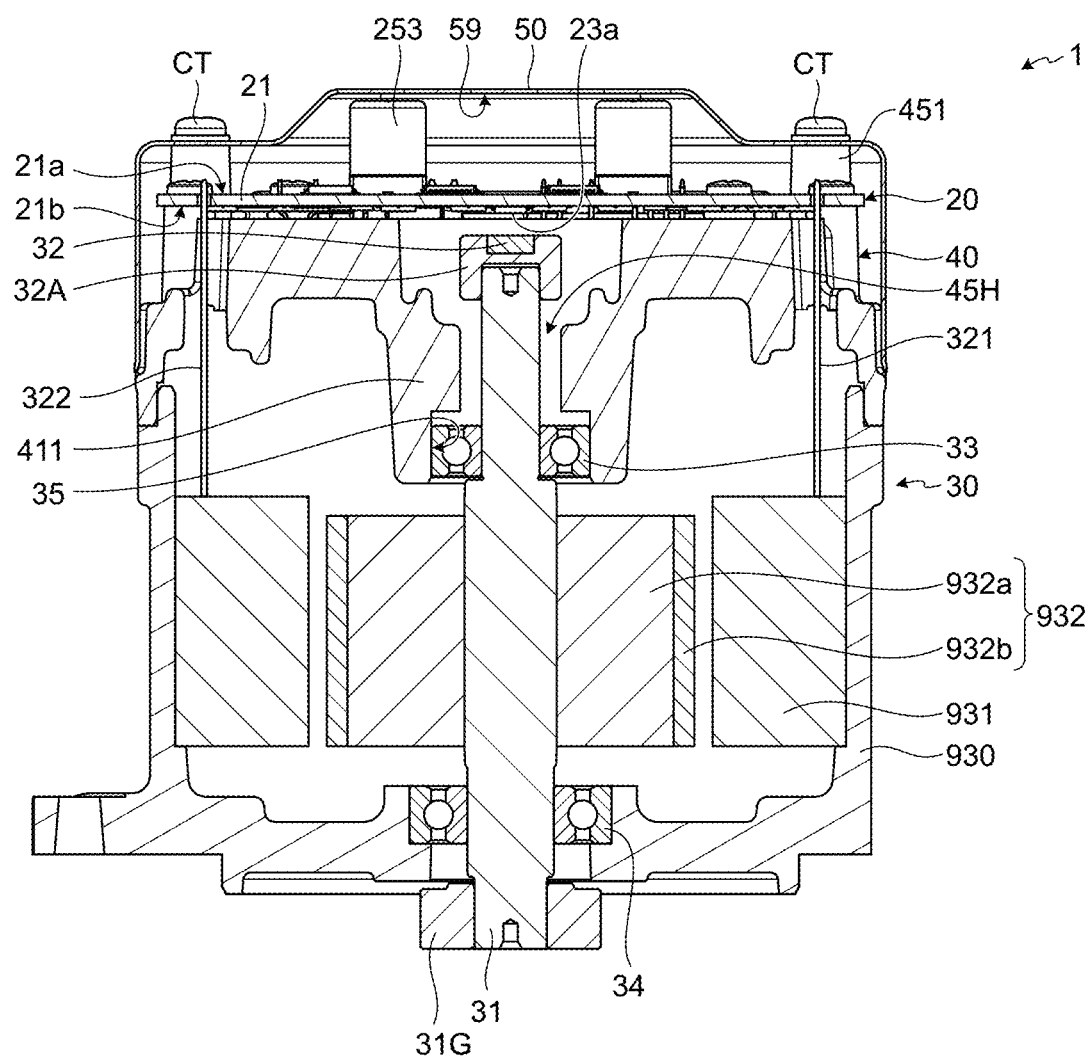
FIG. 8 is a sectional view illustrating a section taken along the line VIII-VIII in FIG. 6.
Figure 9:
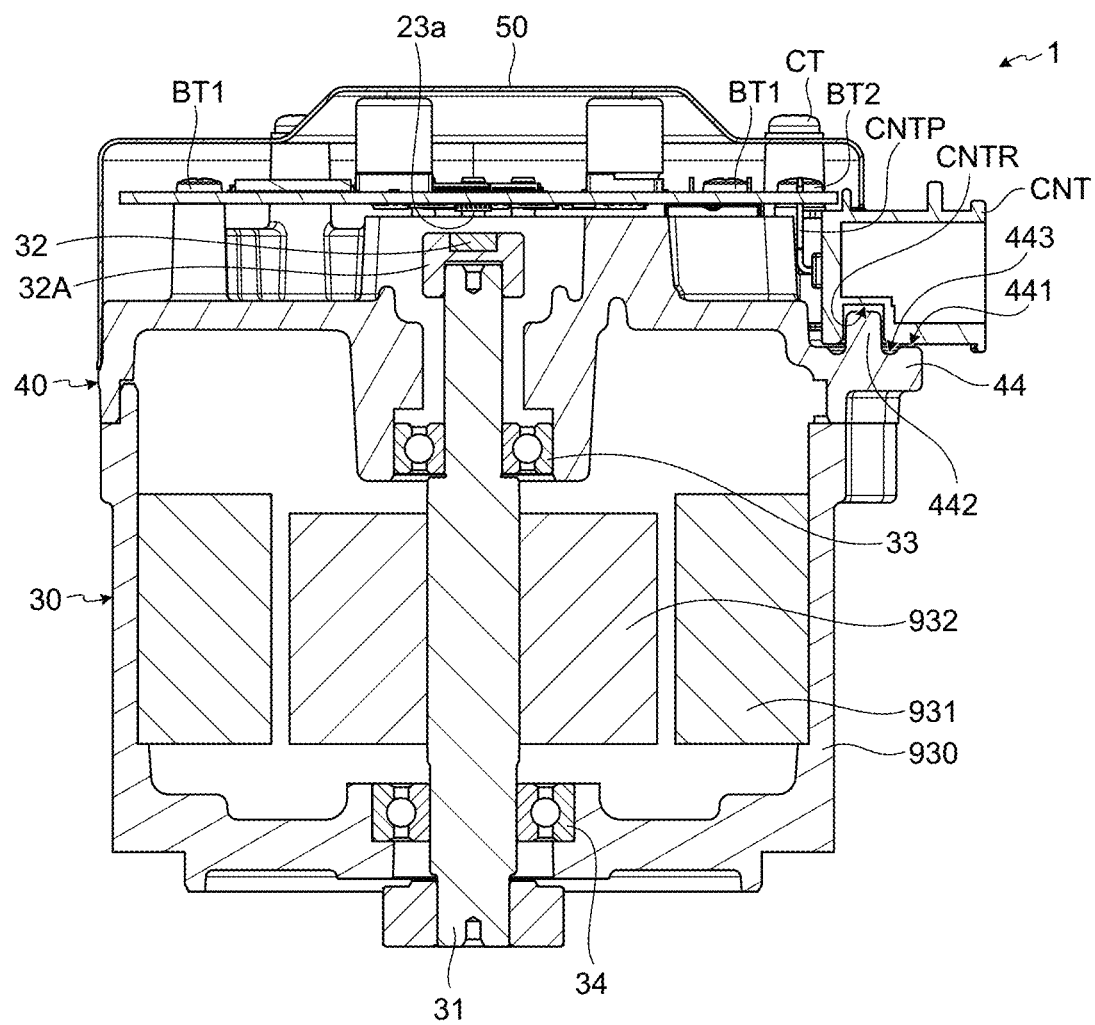
FIG. 9 is a sectional view illustrating a section taken along the line IX-IX in FIG. 7.
Figure 10:
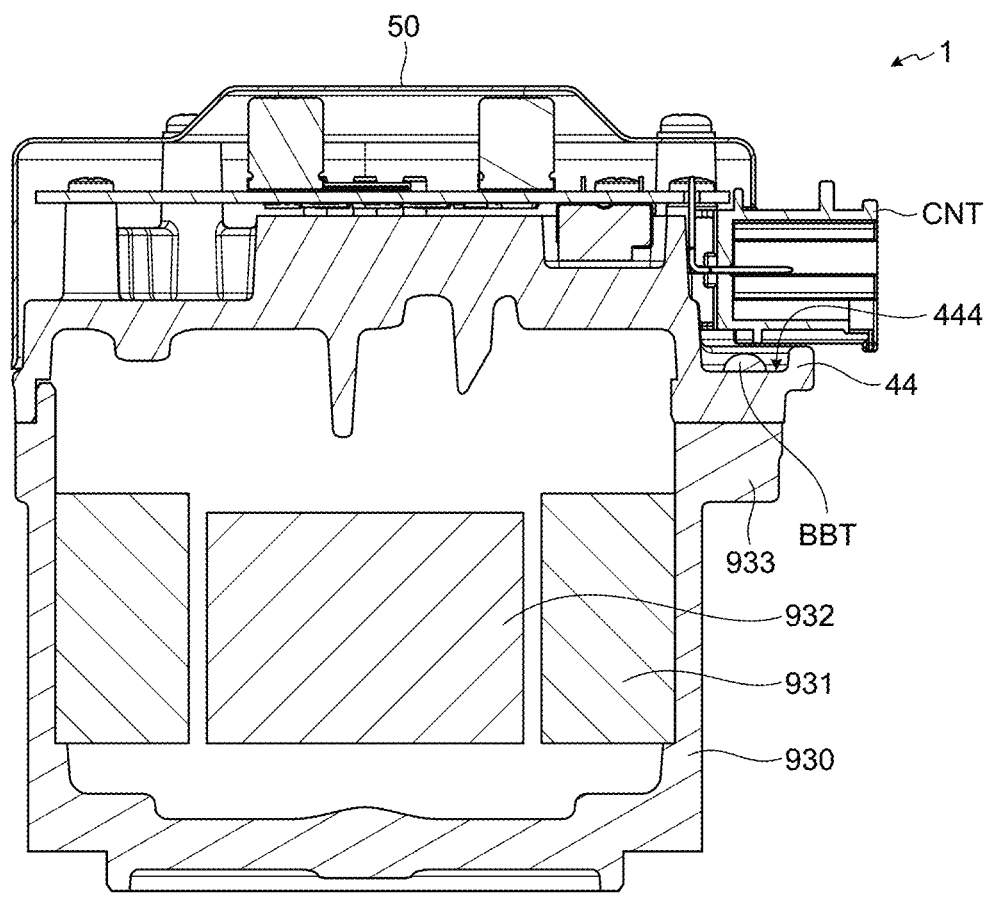
FIG. 10 is a sectional view illustrating a section taken along the line X-X in FIG. 7.
Figure 11:
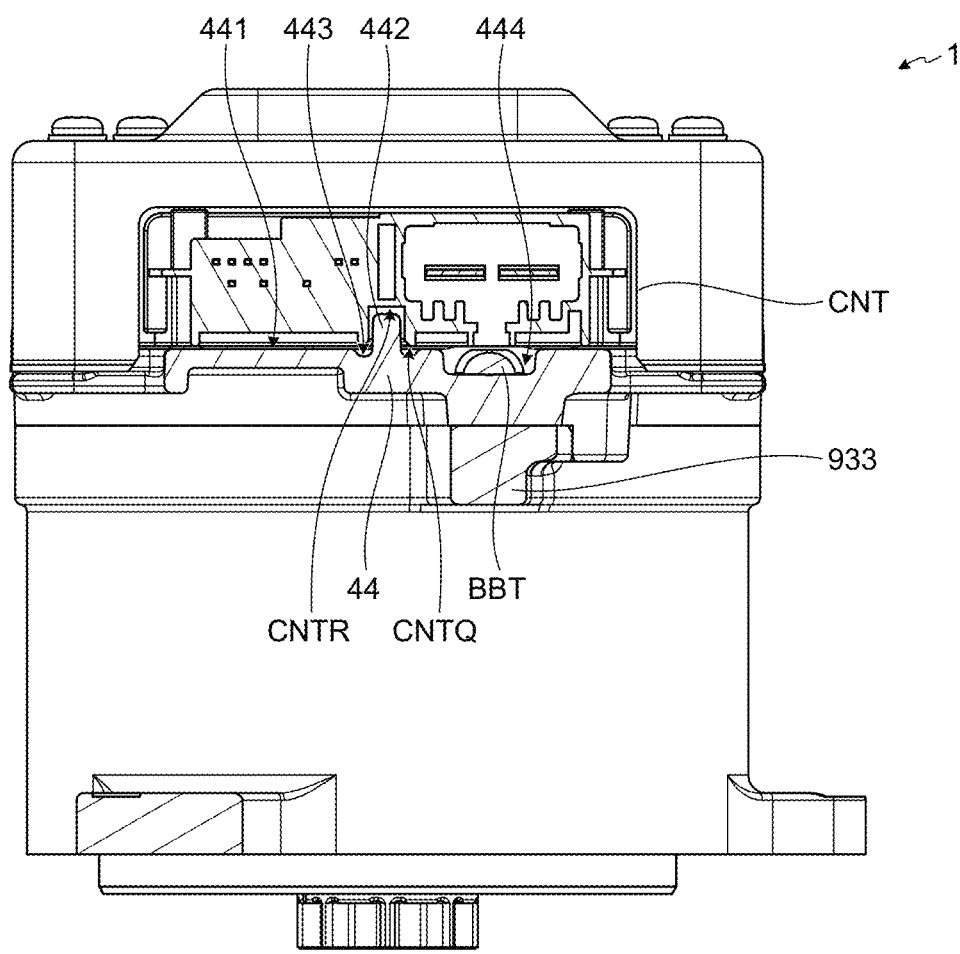
FIG. 11 is a sectional view illustrating a section taken along the line XII-XII in FIG. 6.
Figure 12:
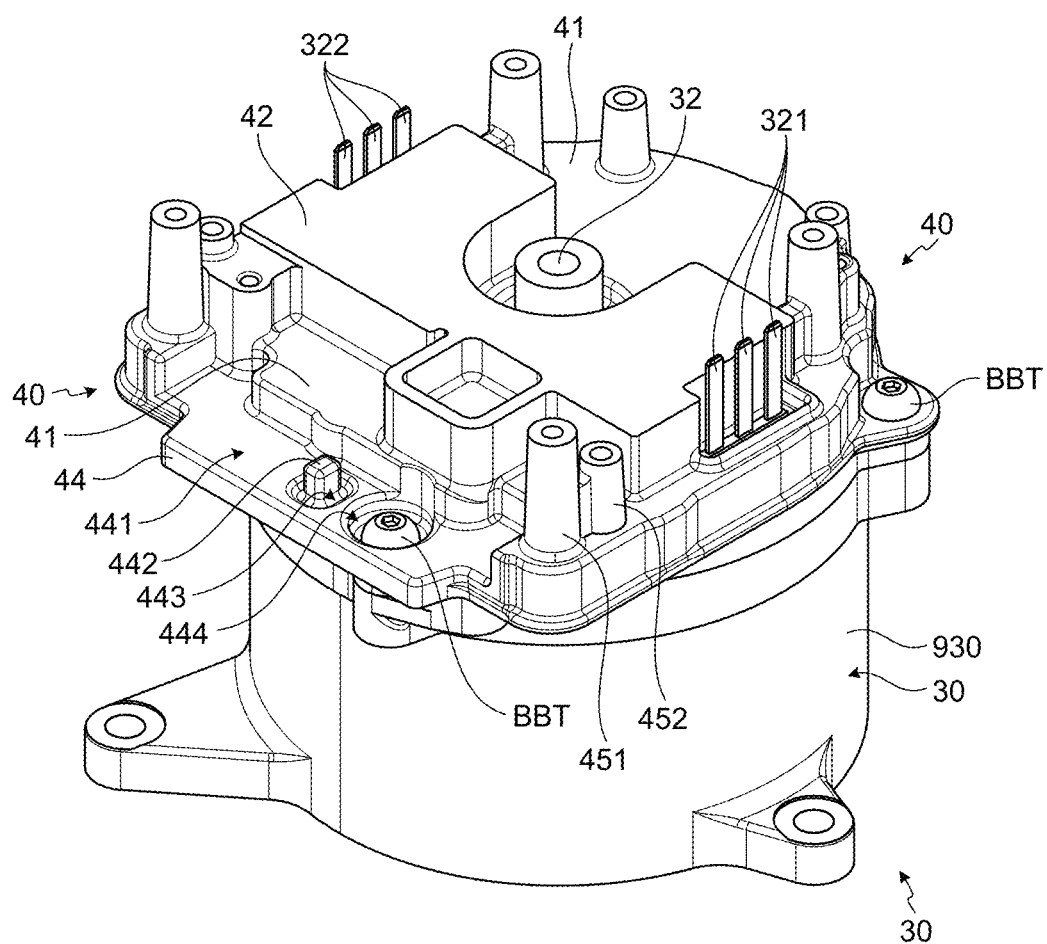
FIG. 12 is a perspective view for describing the electric drive device according to the first embodiment in which a lid body and a circuit board are removed.
Figure 13:
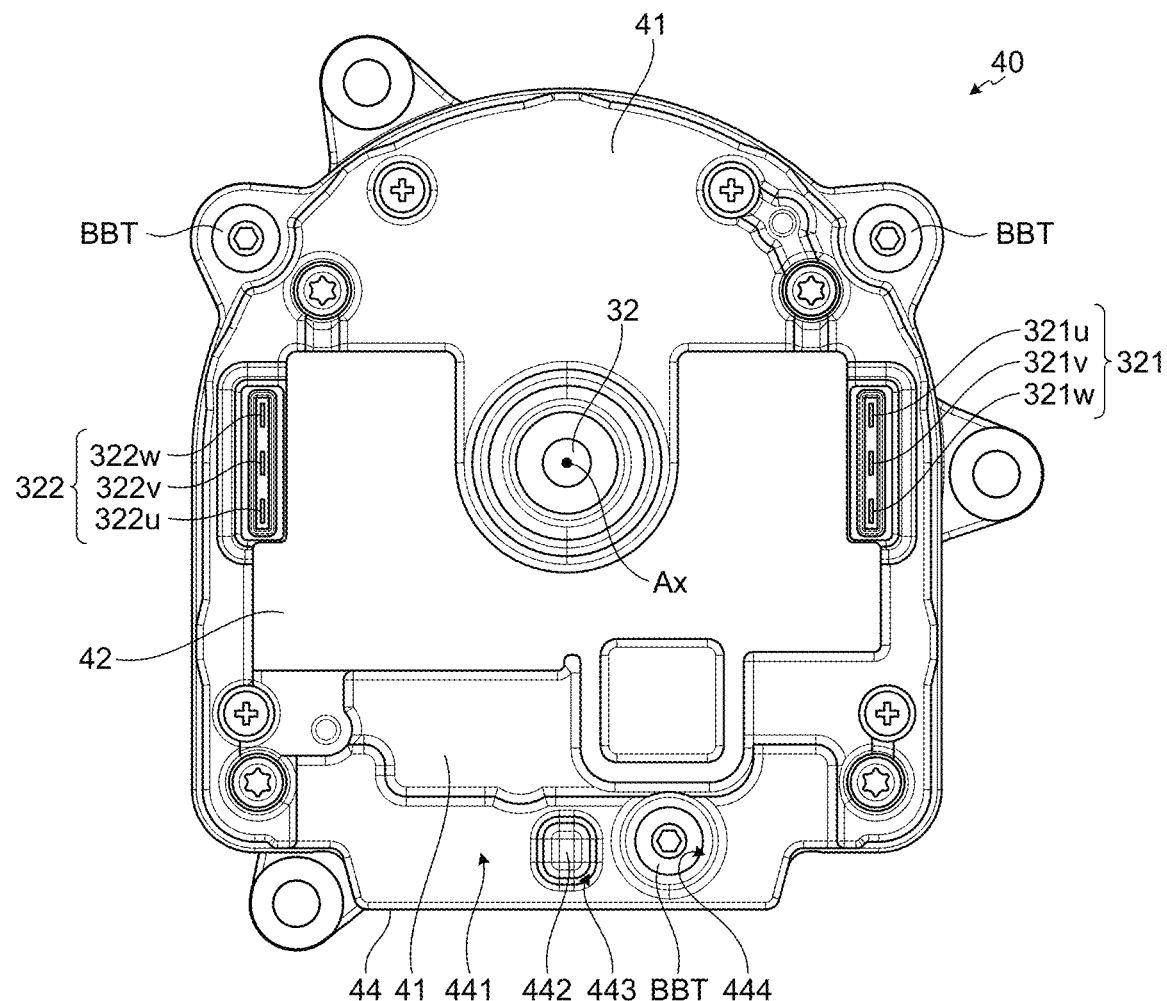
FIG. 13 is a plan view of FIG. 12.

FIG. 6 is a side view of the electric drive device according to the first embodiment. FIG. 7 is a plan view of the electric drive device according to the first embodiment. FIG. 8 is a sectional view illustrating a section taken along the line VIII-VIII in FIG. 6. FIG. 9 is a sectional view illustrating a section taken along the line IX-IX in FIG. 7. FIG. 10 is a sectional view illustrating a section taken along the line XI-XI in FIG. 7. FIG. 11 is a sectional view illustrating a section taken along the line XII-XII in FIG. 6. FIG. 12 is a perspective view for describing the electric drive device according to the first embodiment in which a lid body and a circuit board are removed. FIG. 13 is a plan view of FIG. 12. As illustrated in FIGS. 6 and 7, the electric drive device 1 includes the electric motor 30 and the ECU 10 disposed on an anti-load side of the electric motor 30.

As illustrated in FIGS. 6 and 7, the ECU 10 includes a heat sink 40 and a lid body 50 that covers the anti-load side of the heat sink 40. As illustrated in FIG. 8, the heat sink 40 indicates the circuit board 20, and the lid body 50 covers the circuit board 20. As illustrated in FIG. 9, the circuit board 20 and the connector CNT are attached to the heat sink 40. When viewed from the axial direction Ax, the connector CNT is disposed in a direction in which the connector terminal of a wire harness can be inserted and removed from the radially outer side of the shaft 31 of the electric motor 30. As described above, the ECU 10 includes the circuit board 20, the heat sink 40 that supports the circuit board 20, the connector CNT, and the lid body 50.

As illustrated in FIG. 8, the electric motor 30 includes a housing 930. The motor rotor 932 includes a rotor yoke 932a and a magnet 932b. The magnet 932b is provided on the outer circumferential surface of the rotor yoke 932a. The housing 930 has a tubular shape, and accommodates the motor rotor 932, a stator including a plurality of coil groups divided into two systems for every three phases, for example, the first coil group Gr1 and the second coil group Gr2 (see FIG. 3), and the shaft 31.

As illustrated in FIG. 8, the circuit board 20 includes a board body 21 and a plurality of electronic components mounted on the board body 21. The board body 21 is, for example, a printed board made of resin or the like. The circuit board 20 is a multilayer board provided with a plurality of conductive layers inside, and the circuit board 20 is a double-sided mounting board on which electronic components can be mounted on both sides. Examples of the plurality of electronic components mounted on one board body 21 include a central processing unit (CPU), an application specific integrated circuit (ASIC), a field effect transistor (FET), a magnetic sensor, an electrolytic capacitor, a resistance element, a diode, and a thermistor. The plurality of electronic components constitute the detection circuit 23, the control circuit 24, the first power circuit 25A, and the second power circuit 25B illustrated in FIG. 5.

As illustrated in FIGS. 8 and 9, the heat sink 40 supports the circuit board 20. The circuit board 20 is fixed to one surface (anti-load side) of the heat sink 40. The heat sink 40 is made of a metal material such as aluminum or copper having high heat dissipation, and efficiently dissipates heat generated by the circuit board 20 to the outside.

As illustrated in FIG. 8, the shaft 31 is rotatably supported by a bearing 33 and a bearing 34. The bearing 33 is interposed between the heat sink 40 and the shaft 31. A bearing support 411 and a hollow portion 45H of the heat sink 40 through which the shaft 31 passes are provided on the load side of the heat sink 40. The bearing 33 is disposed in an inside 35 of the hollow portion 45H surrounded by the bearing support 411. The bearing 34 is interposed between the housing 930 and the shaft 31.

As illustrated in FIGS. 8 and 9, a magnet 32 is attached to one end of the shaft 31 via a magnet folder 32A. The magnet 32 is magnetized such that a half thereof is an S pole and a half thereof is an N pole as viewed in the axial direction Ax. Alternatively, the magnet 32 may have an S pole and an N pole alternately disposed on the outer circumferential surface as viewed in the circumferential direction. Since the bearing 33 has high component accuracy, the position of the magnet 32 disposed on the anti-load side of the heat sink 40 in the axial direction Ax is constant. The end where the magnet 32 is located is the end on the anti-load side of the shaft 31.

A motor gear 31G that transmits rotation to the worm shaft 75A (see FIG. 1) is provided at the other end of the shaft 31. The end at which the motor gear 31G is located is the end on the load side of the shaft 31.

The board body 21 includes a first surface 21b and a second surface 21a located on the opposite side of the first surface 21b. The detection circuit 23, the control circuit 24, the first power circuit 25A, and the second power circuit 25B illustrated in FIG. 5 are formed of one or more electronic components mounted on the first surface 21b or the second surface 21a. For example, the rotation angle sensor 23a is formed of one electronic component mounted on the first surface 21b of the board body 21.

The control circuit 24 illustrated in FIG. 5 is formed of a plurality of electronic components mounted on the second surface 21a of the board body 21. The circuit board 20 includes the capacitor 253 mounted on the second surface 21a of the board body 21.

The rotation angle sensor 23a is disposed on the anti-load side of the shaft 31 and on an extension line in the axial direction Ax of the magnet 32. The board body 21 has a plane orthogonal to the axial direction Ax as a mounting surface of the rotation angle sensor 23a. The rotation angle sensor 23a is mounted on the board body 21 so as to be able to sense a change in the magnetic field of the magnet 32. It is desirable that the magnet 32 and the rotation angle sensor 23a face each other in the axial direction Ax. The rotation angle sensor 23a may be provided not on the first surface 21b of the board body 21 but on the second surface 21a, or may be provided on both the first surface 21b and the second surface 21a of the board body 21.

The rotation angle sensor 23a is, for example, a spin valve sensor. The spin valve sensor is a sensor capable of detecting a change in the direction of magnetic flux with an element in which a nonmagnetic layer is sandwiched between a ferromagnetic pin layer whose magnetization direction is fixed by an antiferromagnetic layer or the like and a ferromagnetic free layer. Examples of the spin valve sensor include a giant magneto resistance (GMR) sensor and a tunnel magneto resistance (TMR) sensor. The rotation angle sensor 23a may be any sensor capable of detecting the rotation of the magnet 32. The rotation angle sensor 23a may be, for example, an anisotropic magneto resistance (AMR) sensor or a Hall sensor.

The lid body 50 is made of metal or resin, and suppresses intrusion of foreign matter and moisture into the electric drive device 1. As illustrated in FIG. 8, the lid body 50 is sandwiched and fixed between a support column 451 protruding to the anti-load side of the heat sink 40 and a bolt CT which is a fixing member.

As illustrated in FIGS. 9, 10, and 11, the heat sink 40 includes a pedestal portion 44 that supports the connector CNT. The pedestal portion 44 protrudes radially outward with respect to the inner wall of the housing 930. The connector CNT is disposed on the anti-load side of the pedestal portion 44.

The connector CNT includes a terminal CNTP of the connector CNT including a power supply terminal, a communication terminal that performs CAN communication, and an input/output terminal that inputs/outputs data by a method other than CAN communication. The resin material of the connector CNT is, for example, polybutylene terephthalate (PBT). The terminal CNTP of the connector CNT is electrically connected to the circuit board 20.

As illustrated in FIG. 8, the circuit board 20 is disposed on the anti-load side of the heat sink 40.

As illustrated in FIGS. 12 and 13, the heat sink 40 has a step between a first surface 41 and a second surface 42 on the anti-load side of the heat sink body. The first surface 41 does not have to be a flat surface as long as the surface is lower than the second surface 42 in the axial direction Ax. A placement surface 441 is closer to the load side than the first surface, and the second surface 42 is closer to the anti-load side than the first surface.

As illustrated in FIG. 12, the heat sink 40 includes a support column 451 and a support column 452 protruding from the first surface 41 to the anti-load side. Each of the support column 451 and the support column 452 has a female screw portion opened in the axial direction Ax from the upper surface on the anti-load side. As illustrated in FIG. 12, the support column 451 protrudes more than the circuit board 20. As illustrated in FIG. 8, the lid body 50 is fixed to the heat sink 40 by fastening the bolt CT penetrating the lid body 50 to the female screw portion of the support column 451.

As illustrated in FIG. 9, a bolt BT1 penetrating the circuit board 20 is fastened to the female screw portion of the support column 452 illustrated in FIG. 12. This causes the circuit board 20 to be fixed so as not to be displaced with respect to the heat sink 40.

As illustrated in FIG. 9, the connector CNT is sandwiched between the heat sink 40 and the circuit board 20, and the circuit board 20 and the connector CNT are fixed by a bolt BT2. This causes the connector CNT to be fixed so as not to be displaced with respect to the circuit board 20.

The bolt BT1 to which the heat sink 40 is fixed is disposed at a position adjacent to the circuit board 20 and the bolt BT2. Since the bolt BT1 (second bolt) and the bolt BT2 (third bolt) are close to each other, even when the connector CNT swings, the swinging of the connector CNT can be suppressed by the fastening force of the bolt BT1 in addition to the fastening force of the bolt BT2.

As illustrated in FIG. 12, the electric drive device 1 includes a first coil wiring 321 that connects the first coil group Gr1 and the circuit board 20, and a second coil wiring 322 that connects the second coil group Gr2 and the circuit board 20. The first coil wiring 321 and the second coil wiring 322 may be included in the ECU 10 or may be included in the electric motor 30.

As illustrated in FIG. 12, the first coil wiring 321 and the second coil wiring 322 are inserted into a through hole of the circuit board 20, and the circuit board 20 is electrically connected to the first coil wiring 321 and the second coil wiring 322.

As illustrated in FIGS. 12 and 13, the second surface 42 faces the circuit board 20 in order to dissipate heat generated by the circuit board 20. A heat dissipation material is applied between the circuit board 20 and the second surface 42 of the heat sink 40. The heat dissipation material is, for example, a material obtained by mixing a thermally conductive filler with a silicone polymer, and is called a thermal interface material (TIM). The heat dissipation material may be a material other than the above materials as long as the heat dissipation material is a material having a higher thermal conductivity than the board body 21 of the circuit board 20.

As illustrated in FIGS. 11, 12, and 13, on the anti-load side of the pedestal portion 44, there are the placement surface 441 on which the connector CNT is mounted, a protrusion 442 protruding to the anti-load side with respect to the placement surface 441, a recess 443 that is a root of the protrusion 442 and is recessed to the load side with respect to the placement surface 441, and a recess 444 that is recessed to the load side with respect to the placement surface 441 and accommodates a head portion of a bolt BBT that is a fixing member.

As illustrated in FIGS. 9 and 11, the connector CNT has a recess CNTR on the load side. The protrusion 442 is fitted into the recess CNTR. As viewed in the radial direction of the shaft 31, the recess CNTR is provided in the middle of both side ends of the connector CNT. This makes it possible to secure a conductor space of the connector with a minimum volume of the recess CNTR.

As illustrated in FIG. 12, the protrusion 442 has a prismatic shape. With this configuration, each surface of the prism gives a reaction force to the bending force, and the swinging of the connector CNT is further suppressed. Since the protrusion 442 is made of metal, the connector CNT can be supported even though the protrusion is small.

As illustrated in FIGS. 10 and 12, the bolt BBT penetrating the pedestal portion 44 is fastened to the female screw portion of a flange 933 of the electric motor 30, whereby the heat sink 40 is fixed to the electric motor 30.

Figure 14:
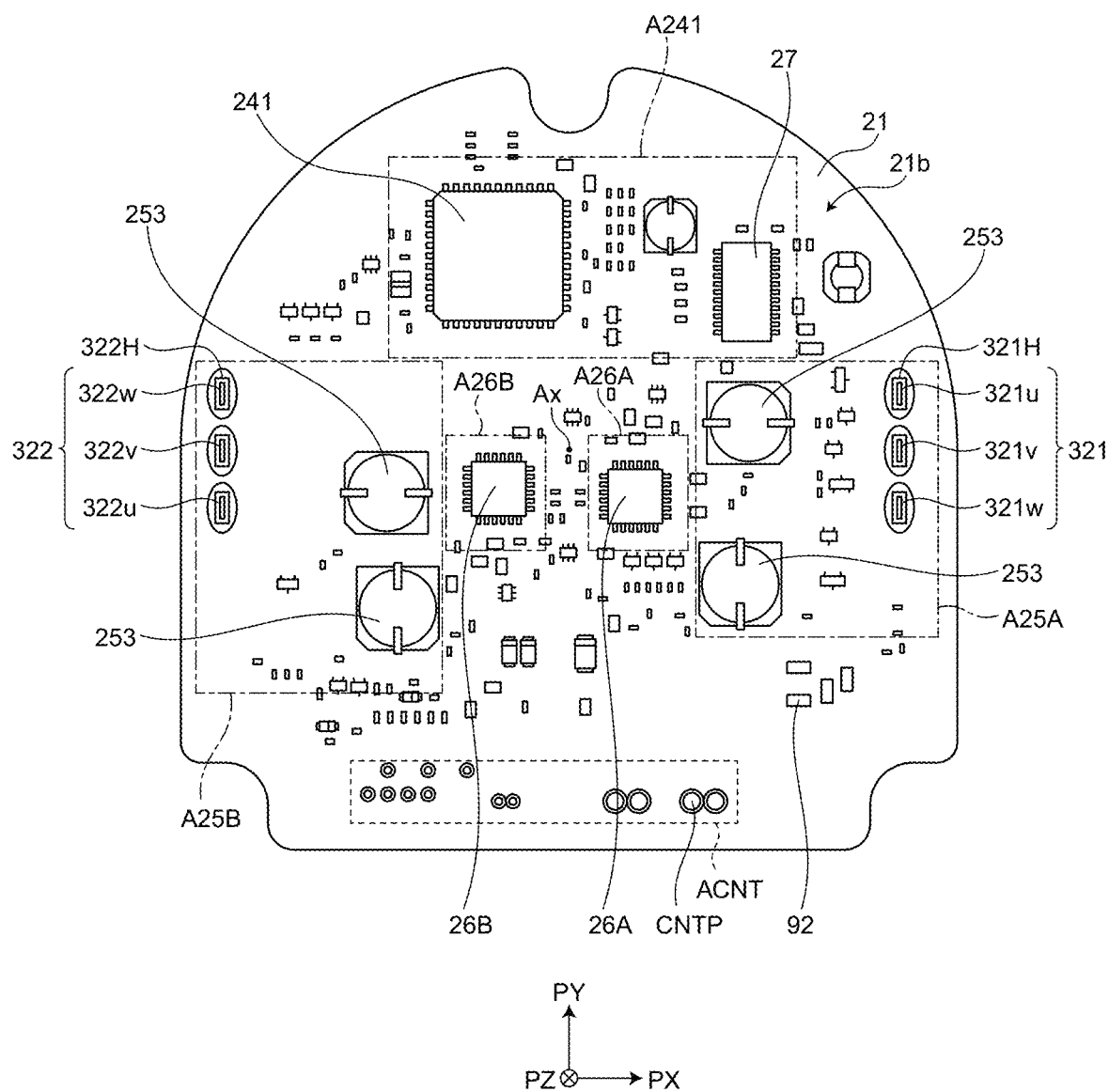
FIG. 14 is a plan view illustrating a mounting state of electronic components on a second surface of a circuit board in the electric drive device according to the first embodiment.
Figure 15:
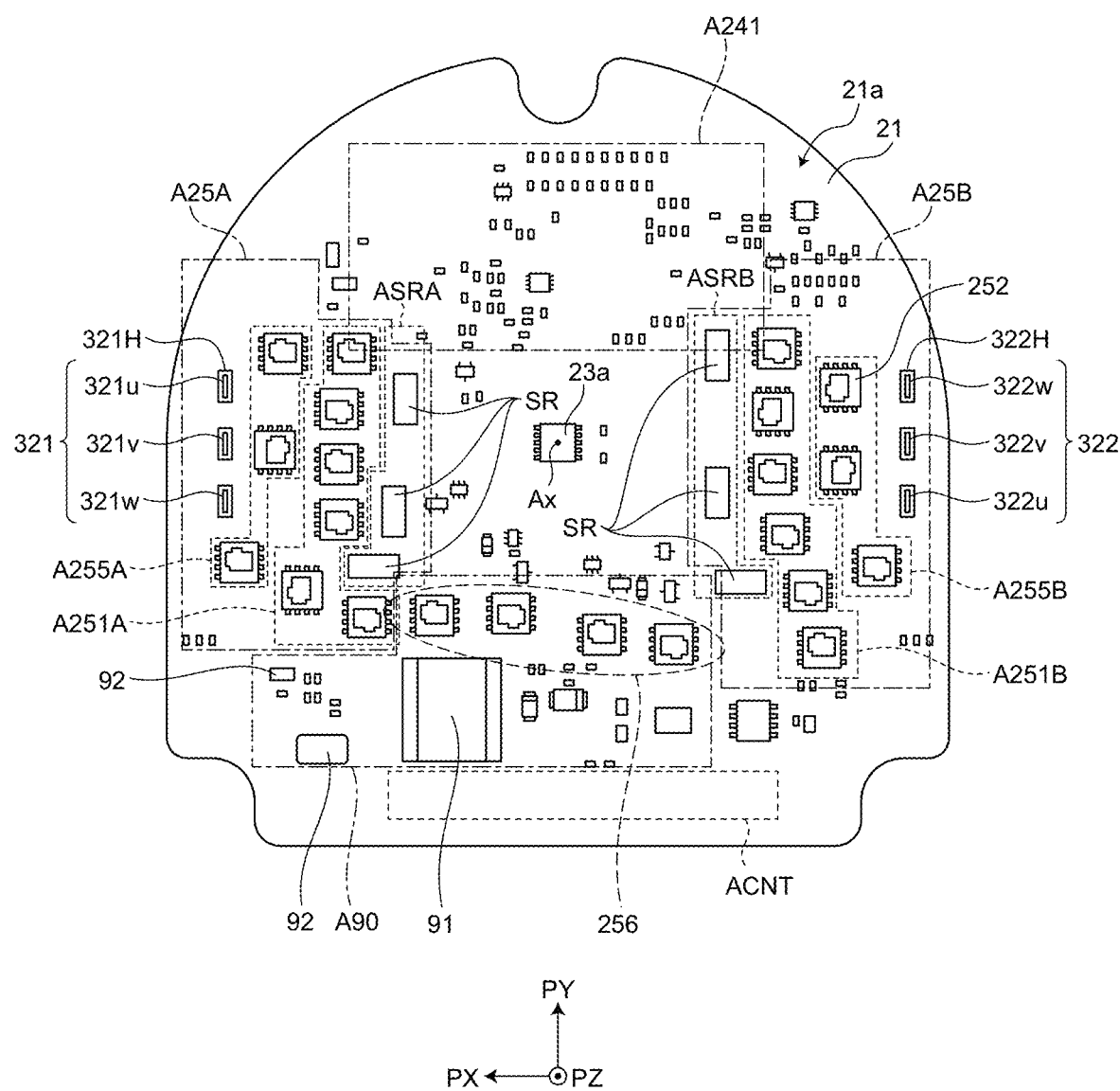
FIG. 15 is a plan view illustrating a mounting state of electronic components on a second surface of a circuit board in the electric drive device according to the first embodiment.
Figure 16:
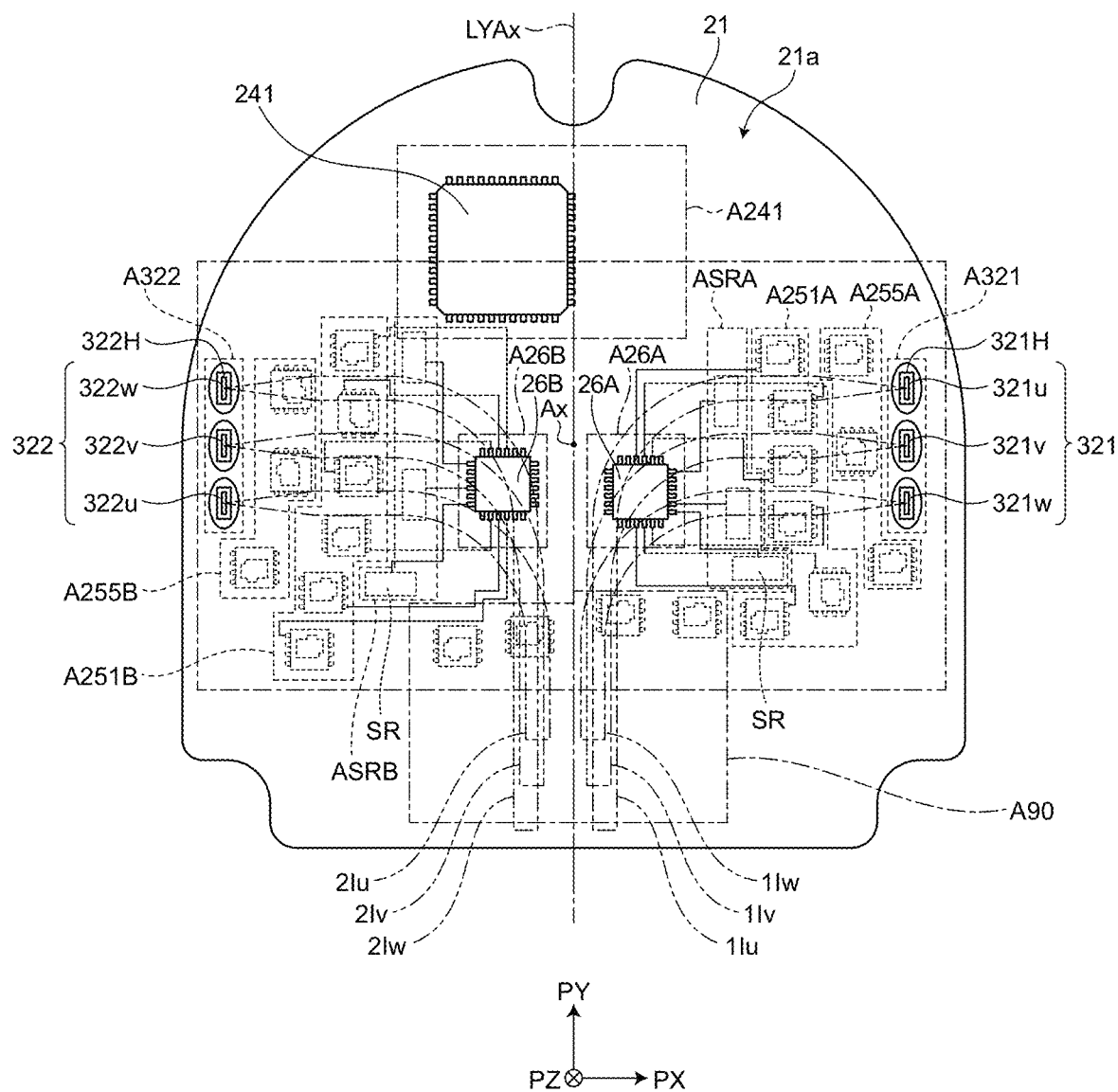
FIG. 16 is a plan view illustrating the electronic components mounted on a first surface and a second surface of a circuit board in an overlapping manner in the electric drive device according to the first embodiment.

FIG. 14 is a plan view illustrating a mounting state of electronic components on a second surface of a circuit board in the electric drive device according to the first embodiment. FIG. 15 is a plan view illustrating a mounting state of electronic components on a second surface of a circuit board in the electric drive device according to the first embodiment. FIG. 16 is a plan view illustrating the electronic components mounted on a first surface and a second surface of a circuit board in an overlapping manner in the electric drive device according to the first embodiment. In FIG. 16, the electronic components mounted on the second surface 21*a* of the board body 21 are indicated by dotted lines. In FIGS. 14 to 16, the board body 21 is parallel to a PX-PY plane parallel to the third direction PZ parallel to the axial direction Ax.

As illustrated in FIG. 14, a disposition area A25A for the first power circuit 25A and a disposition area A25B for the second power circuit 25B are separated from each other in a first direction PX of the board body 21. In the disposition area A25A, the capacitor 253 of the first power circuit 25A is disposed. In the disposition area A25B, the capacitor 253 of the second power circuit 25B is disposed. A mounting area A26A for the first motor driver circuit 26A and a mounting area A26B for the second motor driver circuit 26B are provided between the disposition area A25A for the first power circuit 25A and the disposition area A25B for the second power circuit 25B in a first direction PX.

As illustrated in FIG. 14, a control arithmetic circuit 241 and a power management circuit 27 are mounted in a mounting area A241 of the control circuit. The mounting area A241 for the control circuit and the disposition area ACNT for the terminal to which the terminal CNTP of the connector CNT is connected sandwich the reference position on the extension line of the axial direction Ax of the shaft 31 in a second direction PY intersecting the first direction PX. The mounting area A241 for the control circuit and the disposition area ACNT for the terminal to which the terminal CNTP of the connector CNT is connected sandwich the mounting area A26A for the first motor driver circuit 26A and the mounting area A26B for the second motor driver circuit 26B in the second direction PY intersecting the first direction PX.

As illustrated in FIG. 15, the choke coil 91 and the power supply circuit 256 are disposed in a power circuit area A90 on the second surface 21*a* of the board body 21. As illustrated in FIG. 15, a capacitor 92 is disposed in the power circuit area A90 on the first surface 21*b* of the board body 21. With this configuration, the noise filter circuit 90 is mounted in the power circuit area A90.

With the position on the extension line in the axial direction Ax as a reference position, a mounting area ASRA for the shunt resistor SR, a mounting area A251A for the plurality of drive elements of the inverter circuit 251 included in the first power circuit 25A, and a mounting area A255A for the current cutoff circuit 255 are disposed in order from the reference position to one side in the first direction PX. A mounting area ASRB for the shunt resistor SR, a mounting area A251B for the plurality of drive elements of the inverter circuit 251 included in the second power circuit 25B, and a mounting area A255B for the current cutoff circuit 255 are disposed in this order from the same reference position to the other side in the first direction PX.

As described above, the electric drive device 1 according to the first embodiment includes the electric motor 30, the ECU 10 provided on the anti-load side of the shaft 31 in order to drive and control the electric motor 30, and the connector CNT. The ECU 10 includes the magnet 32 at the end on the anti-load side of the shaft 31 and the circuit board 20 disposed on an extension line in the axial direction (for example, the axial direction Ax) of the shaft 31 on the anti-load side of the shaft 31. The circuit board 20 includes the detection circuit 23 including the rotation angle sensor 23*a* that detects the rotation of the magnet 32. The rotation angle sensor 23*a* is a magnetic sensor that detects the rotation of the magnet 32.

As illustrated in FIG. 16, when the mounting states of the electronic components on the first surface 21*b* and the second surface 21*a* of the circuit board 20 are superimposed, the mounting area A26A for the first motor driver circuit 26A, the mounting area ASRA for the first current detection element, the mounting area A251A for the plurality of drive elements of the first inverter circuit 251A, and the disposition area A321 for the first coil wiring 321 are disposed in order from a reference position to one side in the first direction PX with the position on the extension line in the axial direction Ax of the shaft 31 as the reference position.

The mounting area A26B for the second motor driver circuit 26B, the mounting area ASRB for the second current detection element, the mounting area A251B for the plurality of drive elements of the second inverter circuit 251B, and a disposition area A322 for the second coil wiring 322 are disposed in this order from the same reference position to the other side in the first direction PX.

In the second direction PY, the mounting area A241 for the control arithmetic circuit 241 of the control circuit 24 and the terminal CNTP of the connector sandwich the above reference position (position on the extension line in the axial direction Ax of the shaft 31). As illustrated in FIG. 16, the mounting area A26A for the first motor driver circuit 26A and the mounting area A26B for the second motor driver circuit 26B are distributed in the first direction PX with a reference line LYAx passing through the reference position (position on the extension line in the axial direction Ax of the shaft 31) in the second direction as a boundary. Thus, the mounting area ASRA for the shunt resistor SR and the mounting area ASRB for the shunt resistor SR are distributed in the first direction PX with the reference line LYAx as a boundary. Similarly, with the reference line LYAx as a boundary, the mounting area A251A for the plurality of drive elements of the inverter circuit 251 included in the first power circuit 25A and the mounting area A251B for the plurality of drive elements of the inverter circuit 251 included in the second power circuit 25B are distributed in the first direction PX. Since the mounting area A251A for the plurality of drive elements of the inverter circuit 251 included in the first power circuit 25A and the mounting area A251B for the plurality of drive elements of the inverter circuit 251 included in the second power circuit 25B are separated from each other, heat generation of the drive elements is dispersed.

The mounting area A26A for the first motor driver circuit 26A and the mounting area ASRA for the first current detection element are adjacent to each other. The mounting area A26B for the second motor driver circuit 26B and the mounting area ASRB for the second current detection element are adjacent to each other. With this configuration, since the wiring between the first motor driver circuit 26A and the shunt resistor SR as the first current detection element is shortened, noise in signal amplification in the first motor driver circuit 26A is reduced. Since the wiring between the second motor driver circuit 26B and the shunt resistor SR as the second current detection element is shortened, noise in signal amplification in the second motor driver circuit 26B is reduced. In this manner, the electric drive device 1 can reduce noise superimposed on the detection value detected by the shunt resistor SR in the path from the shunt resistor SR, which is a current detection element, to the control arithmetic circuit 241 of the control circuit 24. As a result, the control circuit 24 drives the electric motor 30 based on the current value with less noise, and thus the torque ripple generated in the motor rotor is suppressed.

As illustrated in FIG. 5, the shunt resistor SR that is the first current detection element detects the current flowing through the drive element of the lower arm among the plurality of drive elements of the first inverter circuit 251A. Similarly, the shunt resistor SR that is the second current detection element detects the current flowing through the drive element of the lower arm among the plurality of drive elements of the second inverter circuit 251B. As illustrated in FIG. 16, since the mounting area ASRA for the first current detection element and the mounting area A251A for the drive element of the first inverter circuit are adjacent to each other, the wiring between the shunt resistor SR and the drive element of the first inverter circuit 251A can be shortened. Since the mounting area ASRB for the second current detection element and the mounting area for the drive element of the second inverter circuit 251B are adjacent to each other, the wiring between the shunt resistor SR and the drive element of the second inverter circuit can be shortened.

The circuit board 20 includes the power circuit area A90 in which the noise filter circuit 90 and the power supply circuit 256 are disposed. The power circuit area A90 is disposed between the above reference position (position on the extension line in the axial direction Ax of the shaft 31) and the terminal CNTP of the connector CNT illustrated in FIG. 14 in the second direction PY. This allows the power circuit area A90 to be disposed in the vicinity of the terminal CNTP of the connector CNT without a large difference between the distance of the wiring to the first inverter circuit 251A and the distance of the wiring to the second inverter circuit 251B.

As illustrated in FIG. 5, the first motor driver circuit 26A includes the booster circuit 245 that generates a gate voltage boosted for driving the plurality of drive elements of the first inverter circuit 251A. The second motor driver circuit 26B includes the booster circuit 245 that generates a gate voltage boosted for driving the plurality of drive elements of the second inverter circuit 251B. As illustrated in FIG. 14, the first motor driver circuit 26A and the first inverter circuit 251A are adjacent to each other, and the second motor driver circuit 26B and the second inverter circuit 251B are adjacent to each other. As a result, the influence of the time constant on the signal waveform of the gate voltage given by the wiring resistance of the wiring connecting the first motor driver circuit 26A to the plurality of drive elements of the first inverter circuit 251A is reduced. Then, even when the gate voltage generated by the booster circuit 245 is suppressed, the first inverter circuit 251A can be driven. Similarly, the influence of the time constant on the signal waveform of the gate voltage given by the wiring resistance of the wiring connecting the second motor driver circuit 26B to the plurality of drive elements of the second inverter circuit 251B is reduced. Then, even when the gate voltage generated by the booster circuit 245 is suppressed, the second inverter circuit 251B can be driven. Then, the drive elements of the first inverter circuit 251A and the second inverter circuit 251B are likely to stably operate at high speed.

As illustrated in FIGS. 14 to 16, among the plurality of first coil wirings 321, a U-phase coil wiring 321*u*, a V-phase coil wiring 321*v*, and a W-phase coil wiring 321*w* are arranged in the second direction PY. Among the plurality of second coil wirings 322, a U-phase coil wiring 322*u*, a V-phase coil wiring 322*v*, and a W-phase coil wiring 322*w* are arranged in the second direction PY. The phase arrangement of the plurality of first coil wirings 321 is reverse to the phase arrangement of the plurality of second coil wirings 322. This causes the power supply path for supplying the first U-phase current I1u, the first V-phase current I1v, and the first W-phase current I1w to be equivalent to the power supply path for supplying the second U-phase current I2u, the second V-phase current I2v, and the second W-phase current I2w.

As described above, the board body 21 of the circuit board 20 is a double-sided mounting board. As illustrated in FIG. 15, the plurality of drive elements of the first inverter circuit 251A and the plurality of drive elements of the second inverter circuit 251B are mounted on the first surface 21b of the board body 21 facing the heat sink 40. As illustrated in FIG. 14, the first motor driver circuit 26A and the second motor driver circuit 26B are mounted on the second surface 21a of the board body 21 on the side opposite to the first surface 21b. The first motor driver circuit 26A and the plurality of drive elements of the first inverter circuit 251A are electrically connected via an internal conductive layer of the circuit board 20. The second motor driver circuit 26B and the plurality of drive elements of the second inverter circuit 251B are electrically connected via an internal conductive layer of the circuit board 20. This configuration improves the mounting density of the electronic components and reduces the size of the circuit board 20. In addition, since the heat generated by the plurality of drive elements of the first inverter circuit 251A and the plurality of drive elements of the second inverter circuit 251B is dissipated by the heat sink 40, the reliability of the electric drive device 1 is improved.

The electric power steering device 100 includes the above-described electric drive device 1, and the electric drive device 1 generates auxiliary steering torque. This suppresses the torque ripple of the electric motor 30 and improves the operability of the electric power steering device 100.

Second Embodiment

Figure 17:
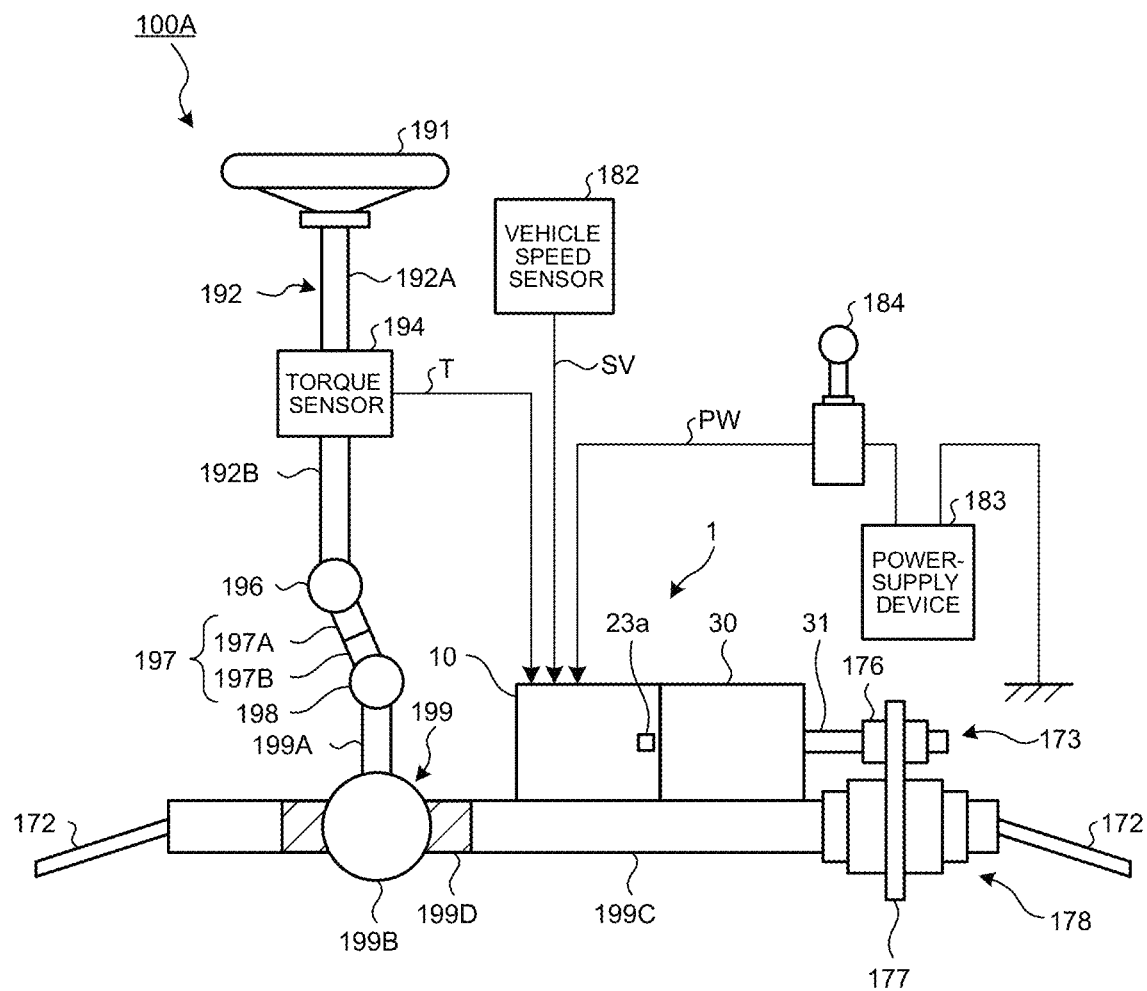
FIG. 17 is a schematic diagram of an electric power steering device according to a second embodiment.

FIG. 17 is a schematic diagram of an electric power steering device according to a second embodiment. The same constituent elements as those described in the first and second embodiments are denoted by the same reference numerals, and redundant description will be omitted.

As illustrated in FIG. 17, an electric power steering device 100A is a rack parallel type electric power steering device. The shaft 31 of the electric motor 30 is connected to a power transmission mechanism 173. The power transmission mechanism 173 includes a pulley 176 and a belt 177. The rotation of the belt 177 rotates a nut of a ball screw device 178. This applies an assist force to the rack shaft 199C based on the rotation of the shaft 31 of the electric motor 30.

Third Embodiment

Figure 18:
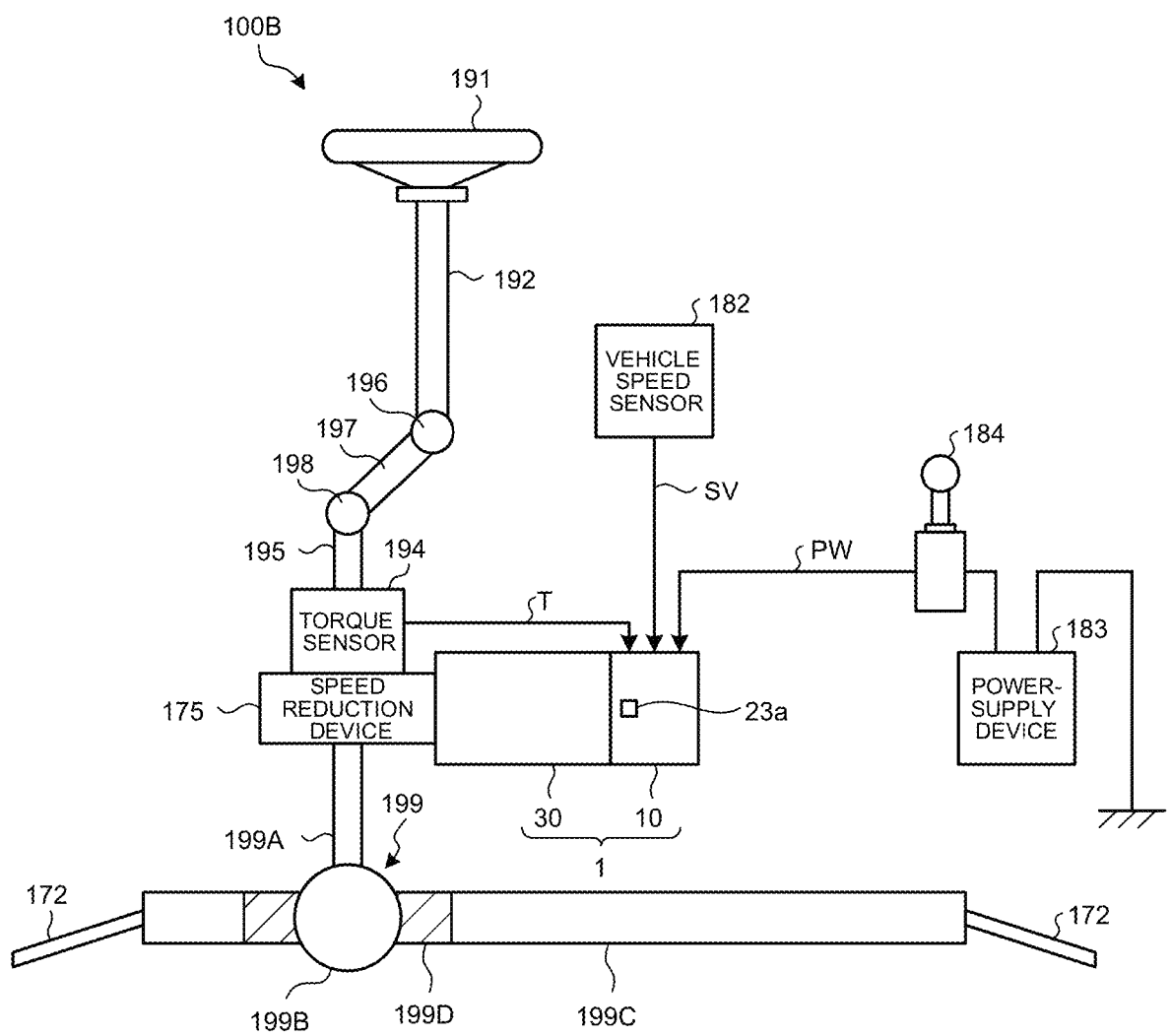
FIG. 18 is a schematic diagram of an electric power steering device according to a third embodiment.

FIG. 18 is a schematic diagram of an electric power steering device according to a third embodiment. The same constituent elements as those described in the first and second embodiments are denoted by the same reference numerals, and redundant description will be omitted. An electric power steering device 100B illustrated in FIG. 18 is a pinion assist type electric power steering device that applies auxiliary steering torque to the first pinion shaft 199A. In the electric power steering device 100B, the torque sensor 194 is connected to the first pinion shaft 199A.

The electric motor 30 rotates the speed reduction device 175 of the worm shaft. The worm wheel of the speed reduction device 175 rotates integrally with the first pinion shaft 199A. Thus, the electric motor 30 can rotate the first pinion gear 199B. The first pinion gear 199B meshes with the first rack 199D. As a result, the electric drive device 1 applies an assist force to the first rack 199D via the speed reduction device 175. The first pinion gear 199B may be disposed orthogonal to the first rack 199D or may be shifted with the orthogonal disposition and obliquely disposed with respect to the first rack 199D. As described above, the electric power steering device 100B of the third embodiment is a single pinion assist type electric power steering device.

Fourth Embodiment

Figure 19:
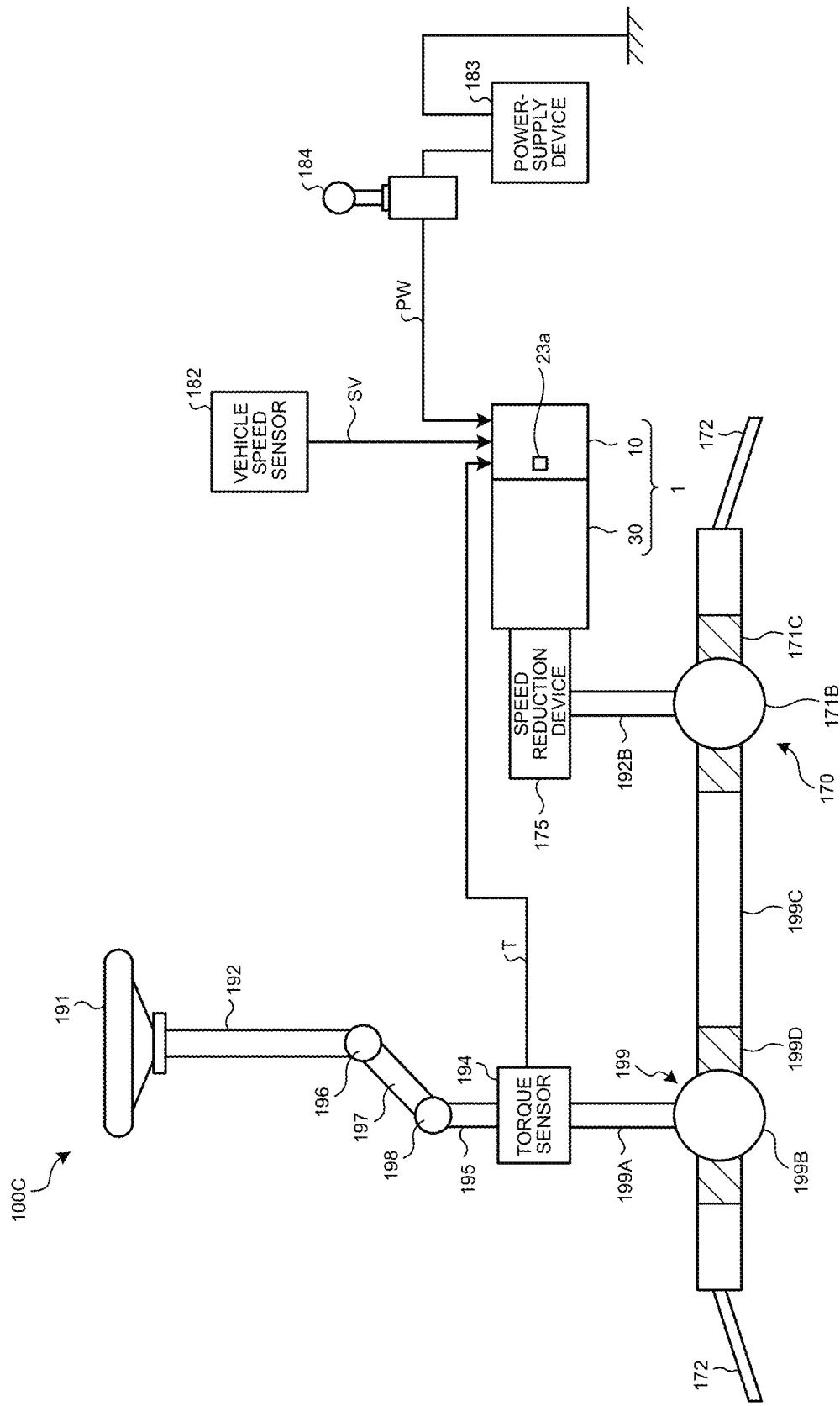
FIG. 19 is a schematic diagram of an electric power steering device according to a fourth embodiment.

FIG. 19 is a schematic diagram of an electric power steering device according to a fourth embodiment. The same constituent elements as those described in the first to third embodiments are denoted by the same reference numerals, and redundant description will be omitted. An electric power steering device 100C includes the output shaft 192B and a second pinion gear 171B in addition to the first pinion shaft 199A and the first pinion gear 199B. The electric power steering device 100C is a dual pinion assist type electric power steering device. The torque sensor 194 detects the torque between a pinion shaft 195 and the first pinion gear 199B.

The electric motor 30 rotates the speed reduction device 75 of the worm shaft. The worm wheel of the speed reduction device 75 rotates integrally with the output shaft 192B. Thus, the electric motor 30 can rotate the second pinion gear 171B. The second pinion gear 171B meshes with a second rack 171C. As a result, the electric drive device 1 applies an assist force to the second rack 171C via the speed reduction device 75. The second pinion gear 171B may be disposed orthogonal to the second rack 171C or may be shifted with the orthogonal disposition and obliquely disposed with respect to the second rack 171C. The electric power steering device 100C of the fourth embodiment is a dual pinion assist type electric pow steering device.

REFERENCE SIGNS LIST

1 ELECTRIC DRIVE DEVICE
10 ECU
20 CIRCUIT BOARD
21 BOARD BODY
21a SECOND SURFACE
21b FIRST SURFACE
23 DETECTION CIRCUIT
23a ROTATION ANGLE SENSOR
23b SENSOR CONTROL UNIT
24 CONTROL CIRCUIT
25A FIRST POWER CIRCUIT
25B SECOND POWER CIRCUIT
26A FIRST MOTOR DRIVER CIRCUIT
26B SECOND MOTOR DRIVER CIRCUIT
27 POWER MANAGEMENT CIRCUIT
30 ELECTRIC MOTOR
31 SHAFT
32 MAGNET
37 FIRST COIL
38 SECOND COIL
40 HEAT SINK
41 FIRST SURFACE
42 SECOND SURFACE
90 NOISE FILTER CIRCUIT
91 CHOKE COIL
92 CAPACITOR
100, 100A, 100B, 100C ELECTRIC POWER STEERING DEVICE
244 CURRENT DETECTION CIRCUIT
245 BOOSTER CIRCUIT
246 POWER RELAY DRIVER CIRCUIT
251 INVERTER CIRCUIT
252 DRIVE ELEMENT
253 CAPACITOR

255 CURRENT CUTOFF CIRCUIT
256 POWER SUPPLY CIRCUIT
257 POWER CUTOFF ELEMENT
258 REVERSE CONNECTION PROTECTION ELEMENT
321 FIRST COIL WIRING
321u, 321v, 321w COIL WIRING
322 SECOND COIL WIRING
322u, 322v, 322w COIL WIRING
930 HOUSING
931 STATOR CORE
932 MOTOR ROTOR

The invention claimed is:

1. An electric drive device comprising:
a shaft extending in an axial direction from a load side to an anti-load side;
a motor rotor interlocked with the shaft;
a motor stator including a stator core that rotates the motor rotor and a plurality of coil groups that are divided into at least two systems of coil groups of a first coil group and a second coil group for every three phases and excite the stator core with three-phase alternating current;
an electric motor including a housing having a tubular shape that accommodates the motor rotor, the motor stator, and the plurality of coil groups inside;
a magnet provided at an end on the anti-load side of the shaft to drive and control the electric motor;
an electronic control device including one circuit board disposed on the anti-load side of the shaft and on an extension line in the axial direction of the shaft;
a heat sink disposed between the circuit board and the electric motor; and
a connector including a terminal connected to the circuit board,
the circuit board including:
a disposition area for a detection circuit that is on an extension line in an axial direction of the magnet, is attached to the circuit board, and includes a magnetic sensor that detects rotation of the magnet;
a mounting area for a plurality of drive elements of a first inverter circuit that supplies a current to the first coil group;
a mounting area for a plurality of drive elements of a second inverter circuit that supplies a current to the second coil group;
a mounting area for a first current detection element that detects a current flowing through the first inverter circuit;
a mounting area for a second current detection element that detects a current flowing through the second inverter circuit;
a mounting area for a first motor driver circuit including a first current detection circuit that amplifies a detection value detected by the first current detection element, and a first gate driver circuit that drives the plurality of drive elements of the first inverter circuit;
a mounting area for a second motor driver circuit including a second current detection circuit that amplifies a detection value detected by the second current detection element, and a second gate driver circuit that drives the plurality of drive elements of the second inverter circuit;
a mounting area for a control circuit that controls the first gate driver circuit based on a current value obtained by amplifying, with the first current detection circuit, the detection value detected by the first current detection element, and controls the second gate driver circuit based on a current value obtained by amplifying, with the second current detection circuit, the detection value detected by the second current detection element;
a disposition area for first coil wires being an area in which each of the first coil wires of the first coil group is connected to a board body of the circuit board; and
a disposition area for second coil wires being an area in which each of the second coil wires of the second coil group is connected to the board body of the circuit board, wherein
the mounting area for the first motor driver circuit, the mounting area for the first current detection element, the mounting area for the plurality of drive elements of the first inverter circuit, and the disposition area for the first coil wires are disposed in order from a reference position to one side in a first direction with a position on the extension line in the axial direction of the shaft as the reference position,
the mounting area for the second motor driver circuit, the mounting area for the second current detection element, the mounting area for the plurality of drive elements of the second inverter circuit, and the disposition area for the second coil wires are disposed in this order from the reference position to the other side in the first direction, and
the mounting area for the control circuit and the terminal of the connector sandwich the reference position in a second direction intersecting the first direction.

2. The electric drive device according to claim 1, wherein the first current detection element detects a current flowing through a drive element of a lower arm among the plurality of drive elements of the first inverter circuit, and the second current detection element detects a current flowing through a drive element of a lower arm among the plurality of drive elements of the second inverter circuit.

3. The electric drive device according to claim 1, wherein the circuit board further includes a power circuit area in which a noise filter circuit and a power supply circuit are disposed, and
the power circuit area is disposed between the reference position and the terminal of the connector in the second direction.

4. The electric drive device according to claim 1, wherein the first motor driver circuit includes a booster circuit that generates a gate voltage boosted for driving the plurality of drive elements of the first inverter circuit, and
the second motor driver circuit includes a booster circuit that generates a gate voltage boosted for driving the plurality of drive elements of the second inverter circuit.

5. The electric drive device according to claim 1, wherein the first coil wires are arranged in the second direction, and
the second coil wires are arranged in the second direction to have a phase arrangement of the of second coil wires in an order opposite to a phase arrangement of the first coil wires.

6. The electric drive device according to claim 1, wherein the board body of the circuit board is a double-sided mounting board, and
the plurality of drive elements of the first inverter circuit and the plurality of drive elements of the second inverter circuit are mounted on a first surface of the board body of the circuit board facing the heat sink, and the first motor driver circuit and the second motor driver circuit are mounted on a second surface of the board body of the circuit board on a side opposite to the first surface.

7. An electric power steering device comprising the electric drive device according to claim 1, wherein the electric drive device generates auxiliary steering torque.

\* \* \* \* \*